US009544793B2

(12) United States Patent
Liu et al.

(10) Patent No.: US 9,544,793 B2
(45) Date of Patent: Jan. 10, 2017

(54) RADIO COMMUNICATION SYSTEM AND METHOD

(75) Inventors: Le Liu, Tokyo (JP); Takamichi Inoue, Tokyo (JP); Naoto Ishii, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 102 days.

(21) Appl. No.: 14/375,515

(22) PCT Filed: Jan. 30, 2012

(86) PCT No.: PCT/JP2012/000563
§ 371 (c)(1),
(2), (4) Date: Oct. 29, 2014

(87) PCT Pub. No.: WO2013/114422
PCT Pub. Date: Aug. 8, 2013

(65) Prior Publication Data
US 2015/0049621 A1 Feb. 19, 2015

(51) Int. Cl.
| | |
|---|---|
| *H04W 24/08* | (2009.01) |
| *H04B 7/02* | (2006.01) |
| *H04B 17/345* | (2015.01) |
| *H04L 5/00* | (2006.01) |
| *H04B 17/24* | (2015.01) |
| *H04B 17/309* | (2015.01) |

(52) U.S. Cl.
CPC ............. *H04W 24/08* (2013.01); *H04B 7/024* (2013.01); *H04B 17/345* (2015.01); *H04L 5/0035* (2013.01); *H04L 5/0048* (2013.01); *H04L 5/0057* (2013.01); *H04B 17/24* (2015.01); *H04B 17/309* (2015.01)

(58) Field of Classification Search
CPC .... H04L 5/0048; H04L 5/0057; H04L 5/0035; H04B 17/345; H04B 17/24; H04B 17/309; H04B 7/024; H04W 24/08
See application file for complete search history.

(56) References Cited

U.S. PATENT DOCUMENTS

| | | | |
|---|---|---|---|
| 2011/0217985 A1* | 9/2011 | Gorokhov | H04W 24/10 455/452.2 |
| 2012/0155291 A1* | 6/2012 | Koivisto | H04B 7/024 370/252 |

FOREIGN PATENT DOCUMENTS

| | | |
|---|---|---|
| JP | 2011-223095 | 11/2011 |
| WO | WO 2011/100520 A1 | 8/2011 |

(Continued)

OTHER PUBLICATIONS

Office Action issued by the Japanese Patent Office in counterpart Japanese Patent Application No. 2014-553863, dated Sep. 30, 2015.

(Continued)

*Primary Examiner* — Jianye Wu
(74) *Attorney, Agent, or Firm* — Finnegan, Henderson, Farabow, Garrett & Dunner LLP

(57) ABSTRACT

A radio communication system includes a network and a user terminal, wherein the network includes a plurality of radio stations and a controller which controls the plurality of radio stations, wherein at least two of the plurality of radio stations communicate with the user terminal, wherein the controller notifies the user terminal of information about resource for interference measurement, wherein the user terminal calculates and reports channel quality information based on the information.

24 Claims, 24 Drawing Sheets

(56) References Cited

FOREIGN PATENT DOCUMENTS

WO     WO 2011/132988 A2    10/2011
WO     WO 2011/140264 A1    11/2011

OTHER PUBLICATIONS

3GPP TSG RAN WG1 Meeting #63BIS, R1-110107, "Analysis of the capacity and latency constraints in CoMP", Jan. 2011.
3GPP TSG-RAN WG1 Meeting #67 R1-113893, "Interference measurements for Release 11", Nov. 2011.
3GPP TR 36.819 V11.0.0, $3^{rd}$ Generation Partnership Project, "Coordinated multi-point operation for LTE physical layer aspects", Release 11, Sep. 2011.
3GPP TS 36.211 V10.3.0, $3^{rd}$ Generation Partnership Project, "Evolved Universal Terrestrial Radio Access (E-UTRA); Physical Channels and Modulation", Release 10, Sep. 2011.
3GPP TS 36.331 V10.3.0, $3^{rd}$ Generation Partnership Project, "Evolved Universal Terrestrial Radio Access (E-UTRA); Radio Resource Control (RRC); Protocol specification", Release 10, Sep. 2011.
3GPP TSG RAN WG1 #67, R1-114228, "Interference Measurement for Downlink CoMP", Nov. 2011.
3GPP TSG-RAN WG1 #67 R1-114260, "On UE Interference Measurement", Nov. 2011.
3GPP TS-RAN WG1 Meeting #67 R1-114318, "CQI for R11 CoMP with CRS and CSI-RS based feedback", Nov. 2011.
International Search Report and Written Opinion mailed Oct. 11, 2012.

\* cited by examiner

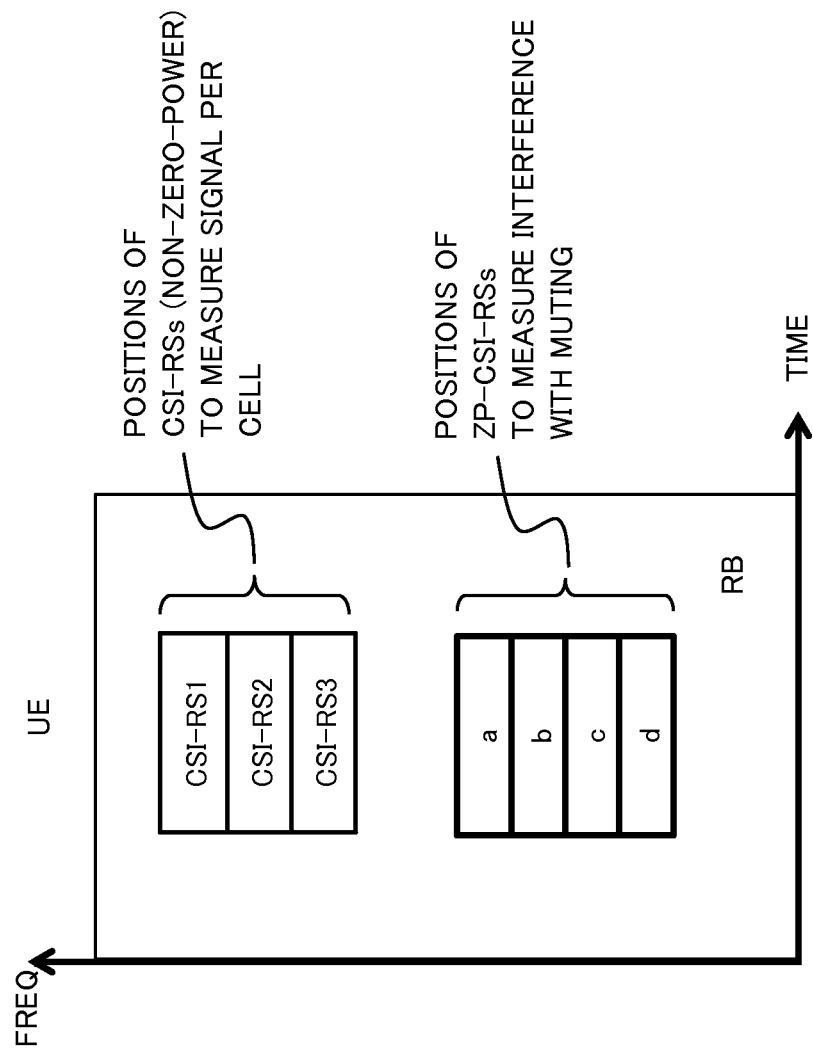

FIG. 2C
(RELATED ART)

CQI PER CSI-RS RESOURCE AT UE

|  | CSI-RS1 | CSI-RS2 | CSI-RS3 |
|---|---|---|---|
| ZP-CSI-RSa | S1/Ia | S2/Ia | _S3/Ia_ |
| ZP-CSI-RSb | S1/Ib | _S2/Ib_ | S3/Ib |
| ZP-CSI-RSc | _S1/Ic_ | S2/Ic | S3/Ic |
| ZP-CSI-RSd | S1/Id | S2/Id | S3/Id |

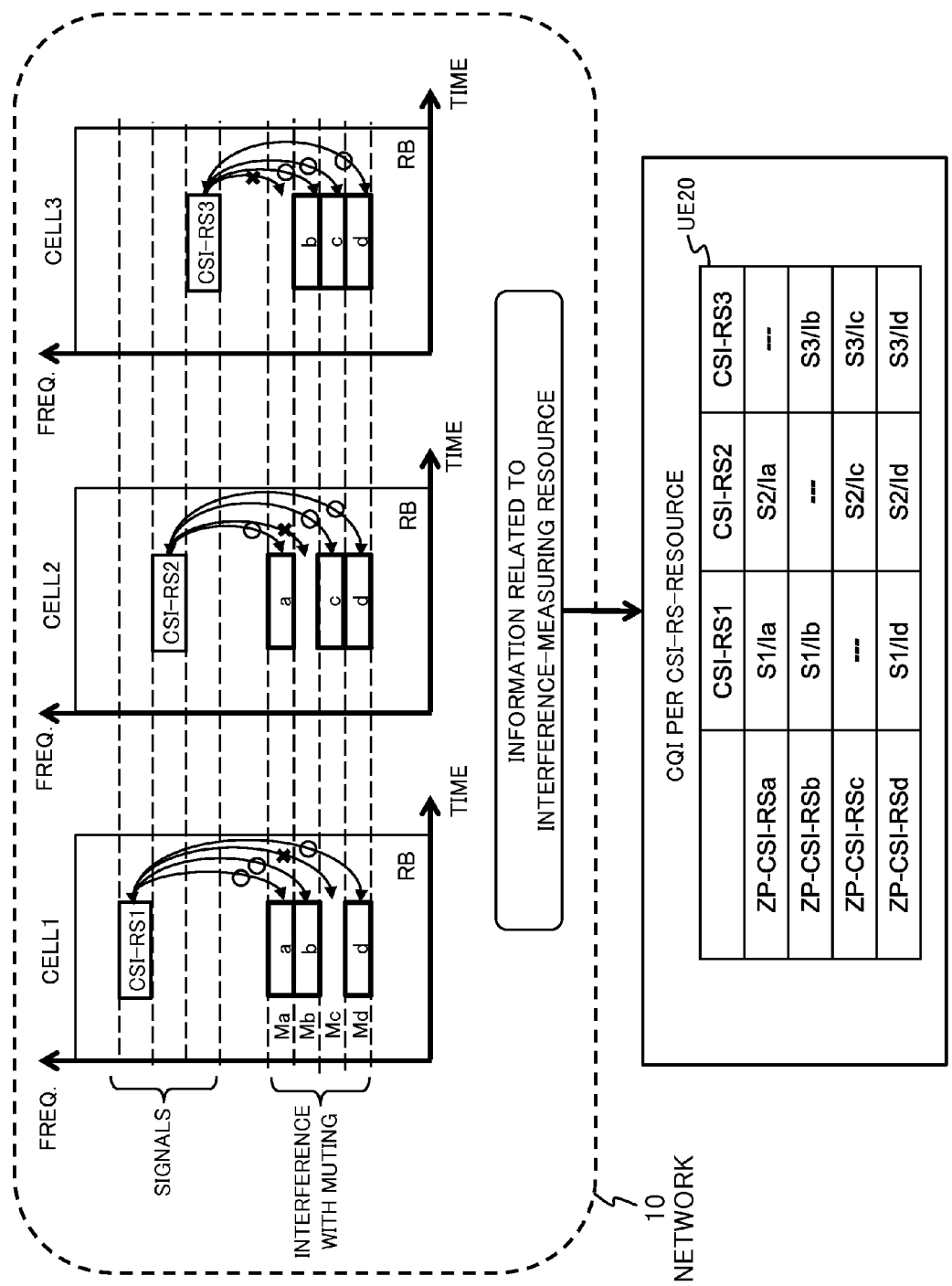

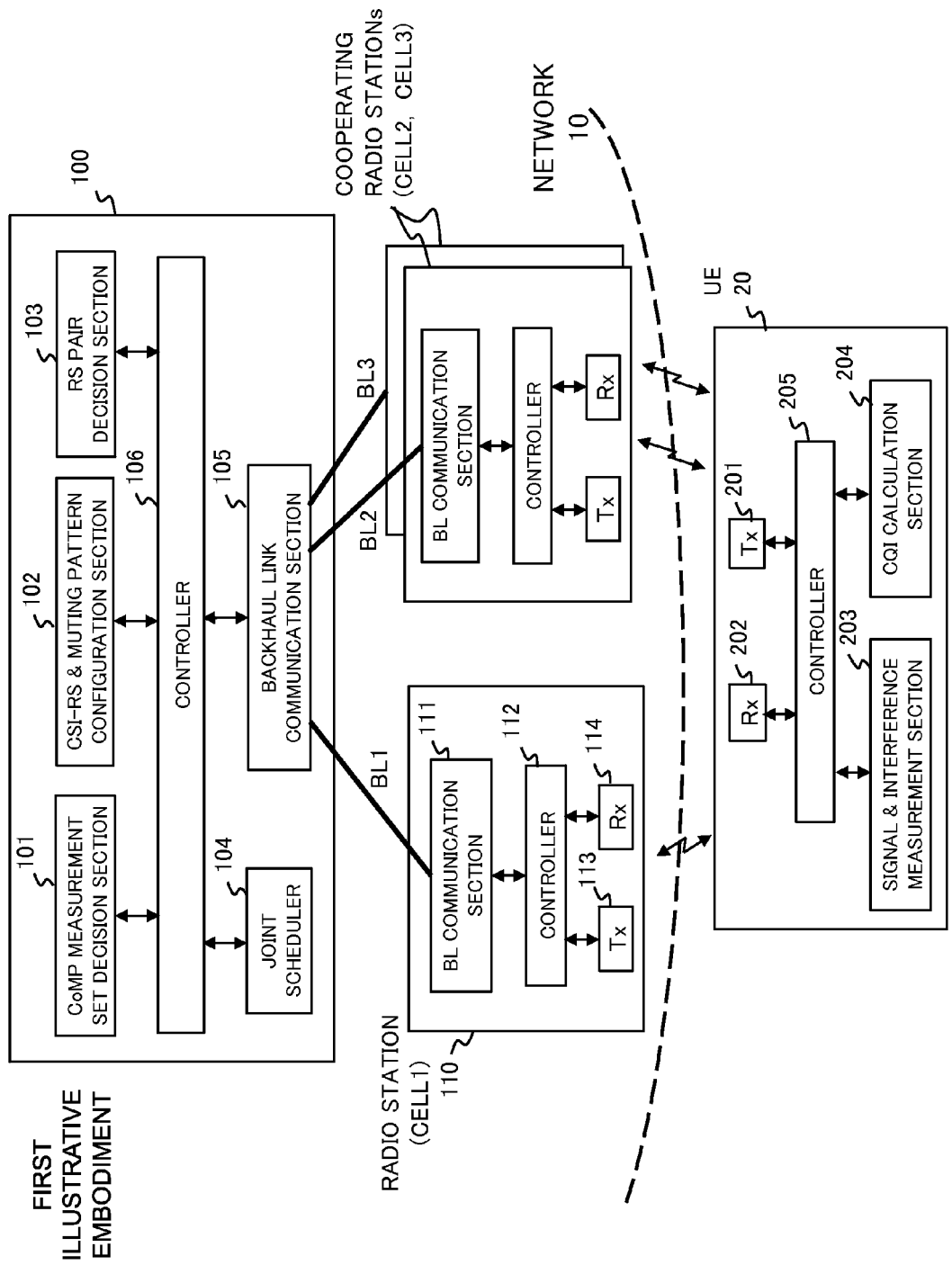

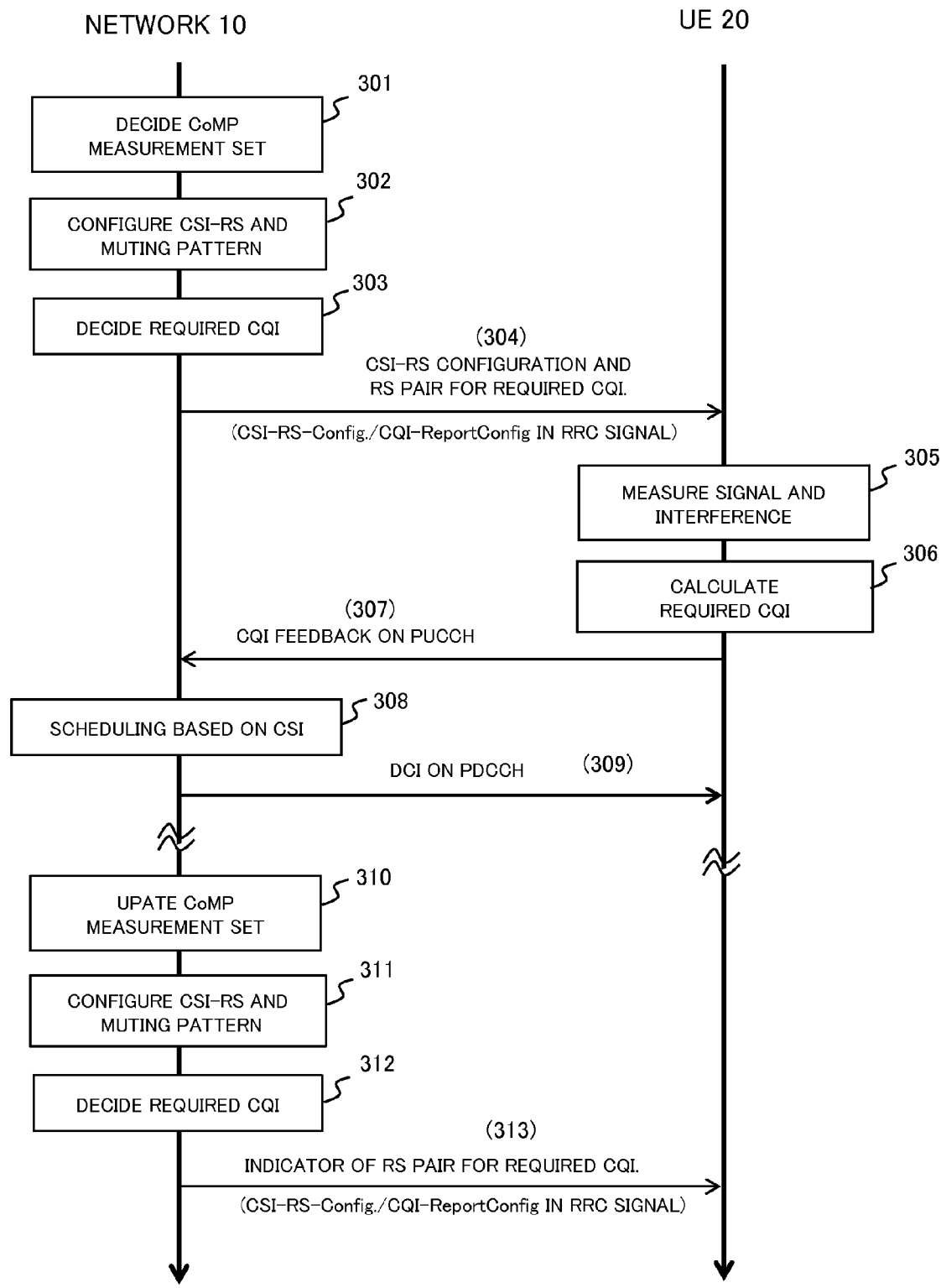

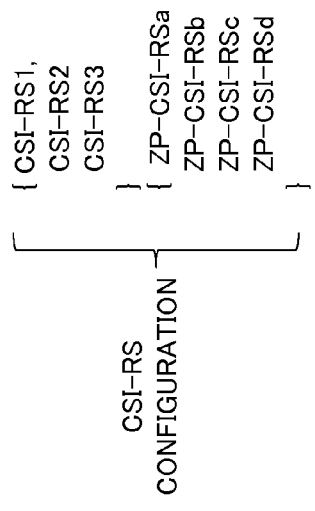

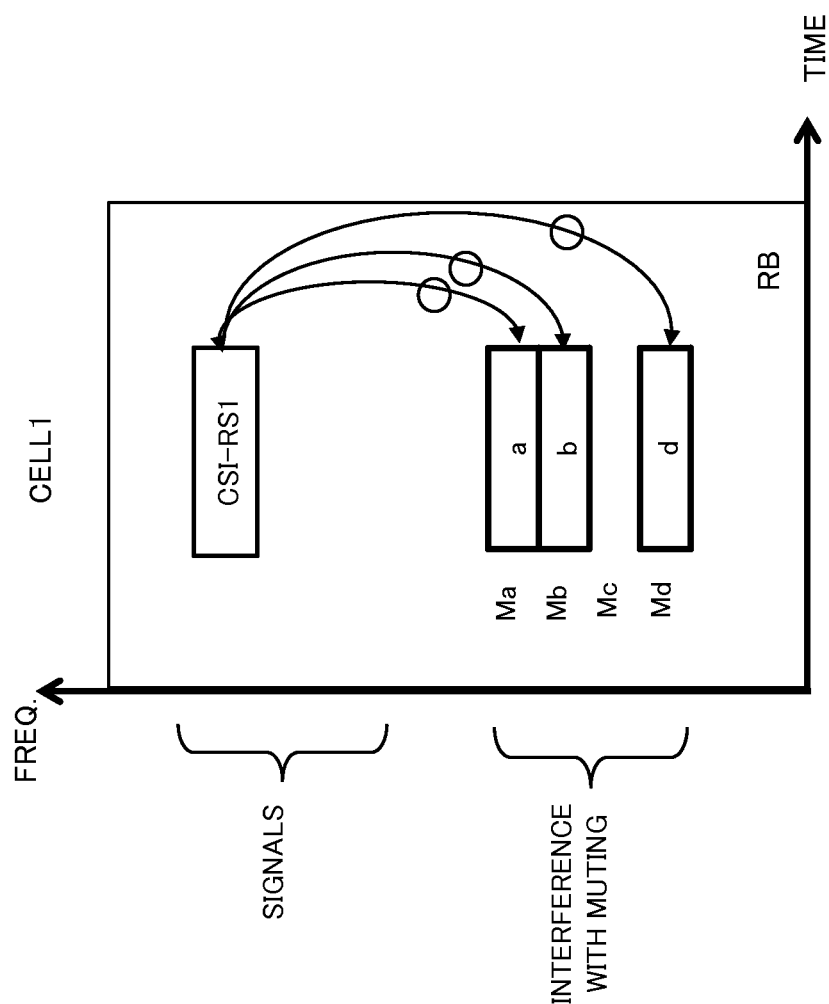

FIG. 6C

{ CSI-RS1
ZP-CSI-RSa
ZP-CSI-RSb
ZP-CSI-RSd
}

{ CSI-RS2
ZP-CSI-RSa
ZP-CSI-RSc
ZP-CSI-RSd
}

{ CSI-RS3
ZP-CSI-RSb
ZP-CSI-RSc
ZP-CSI-RSd
}

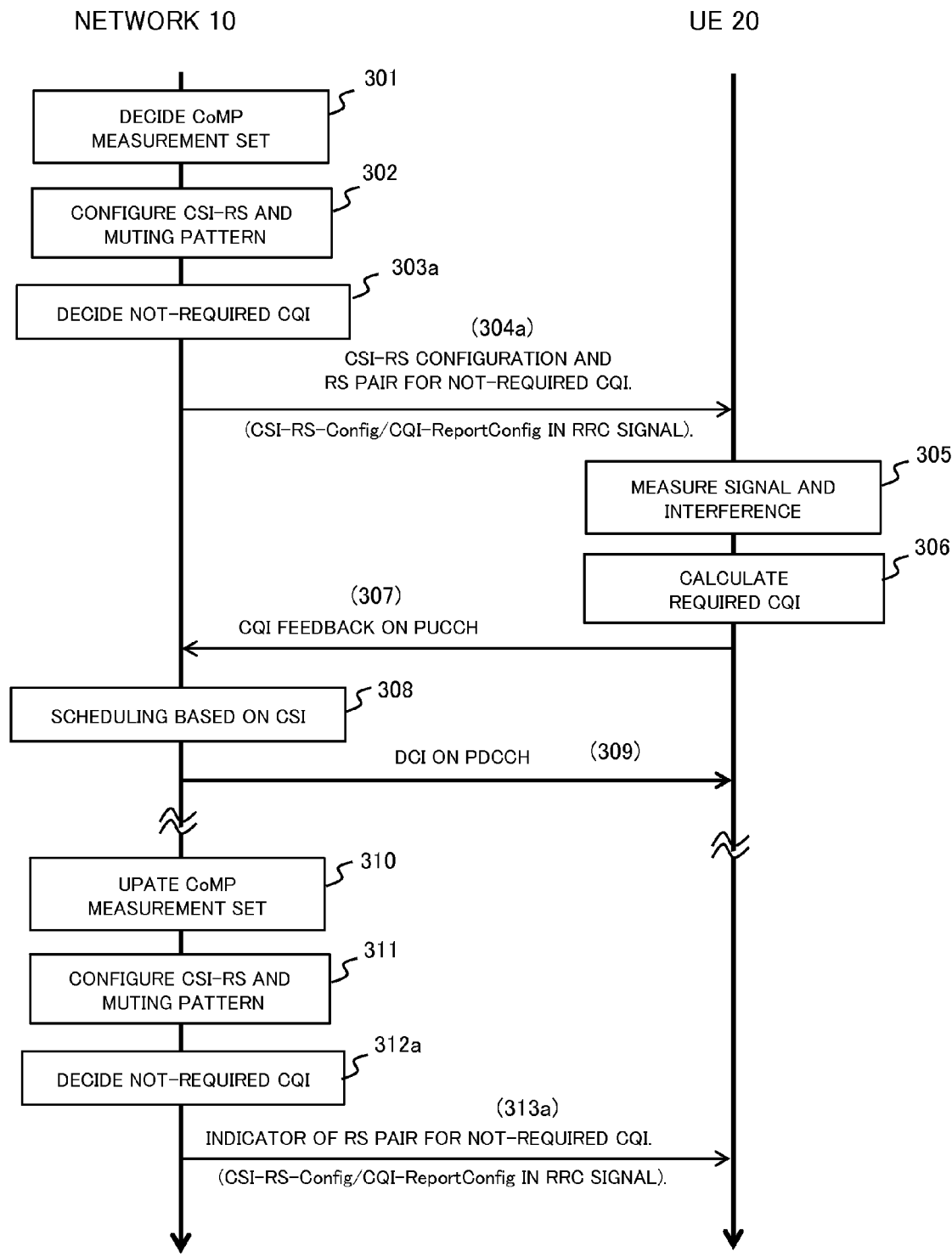

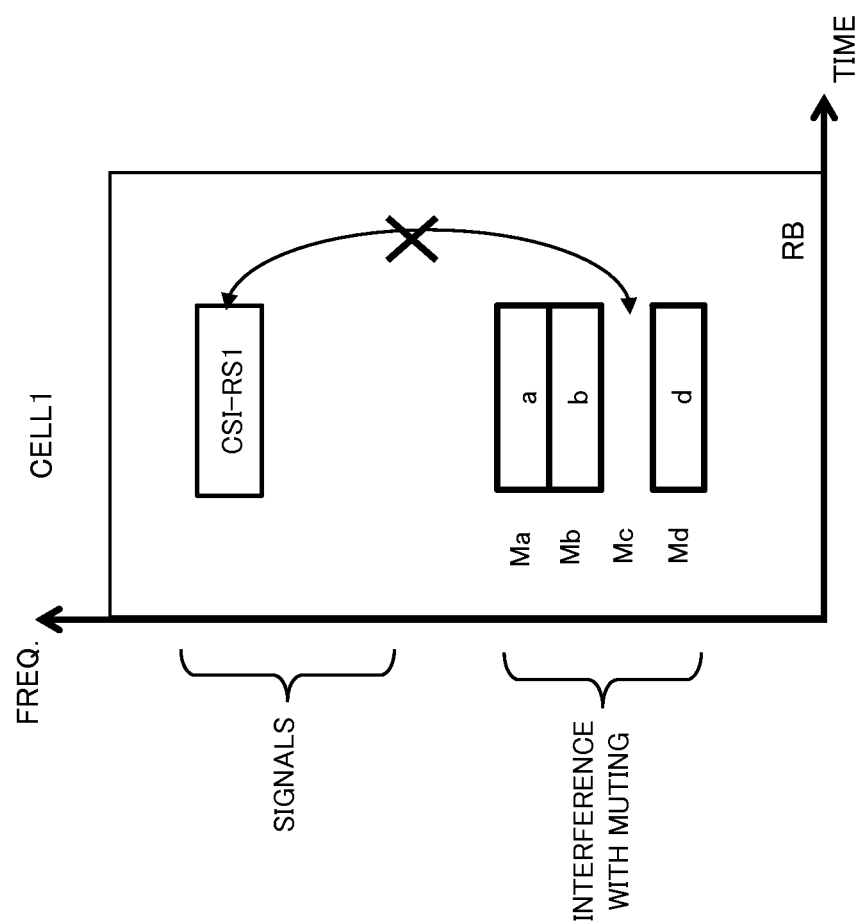

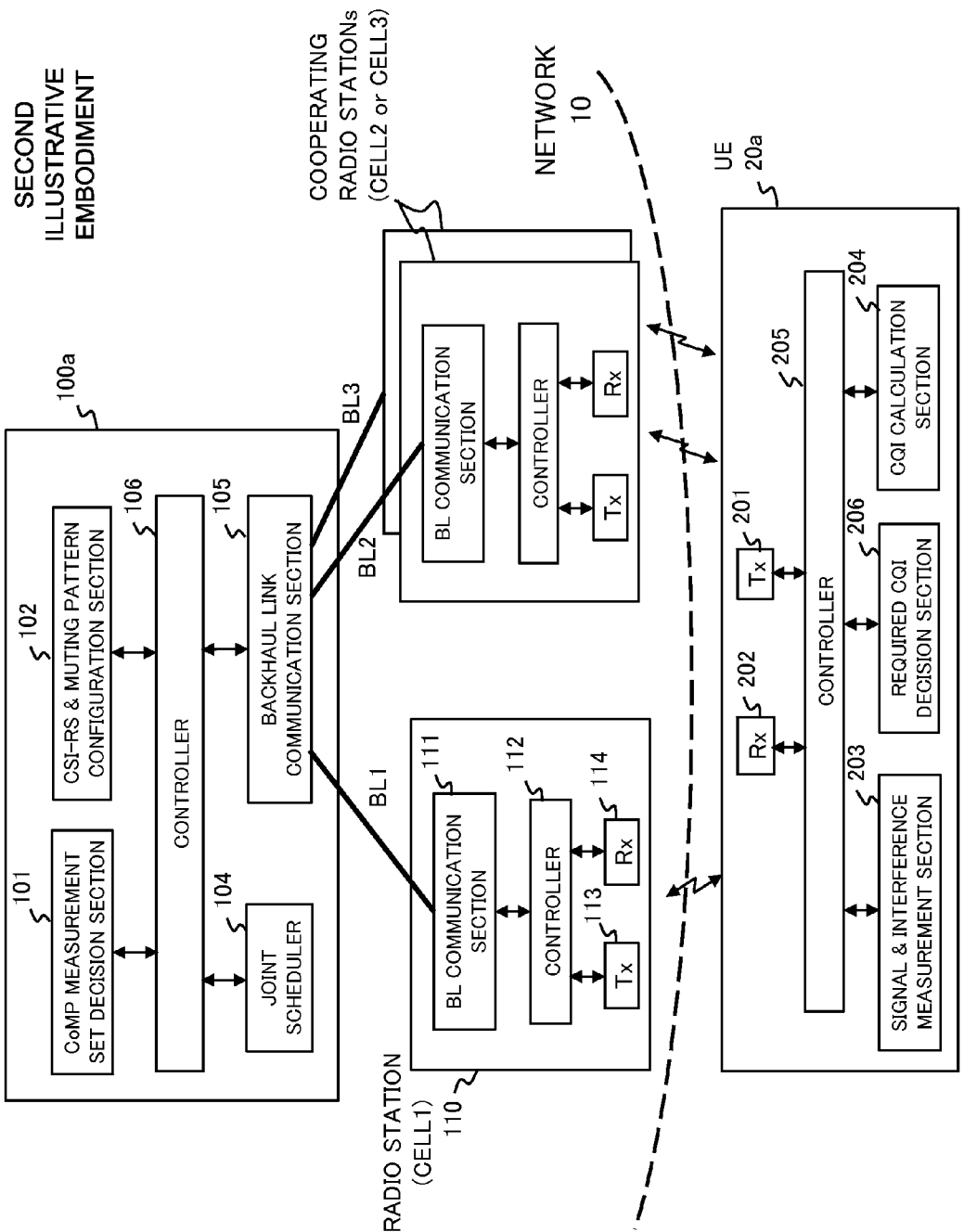

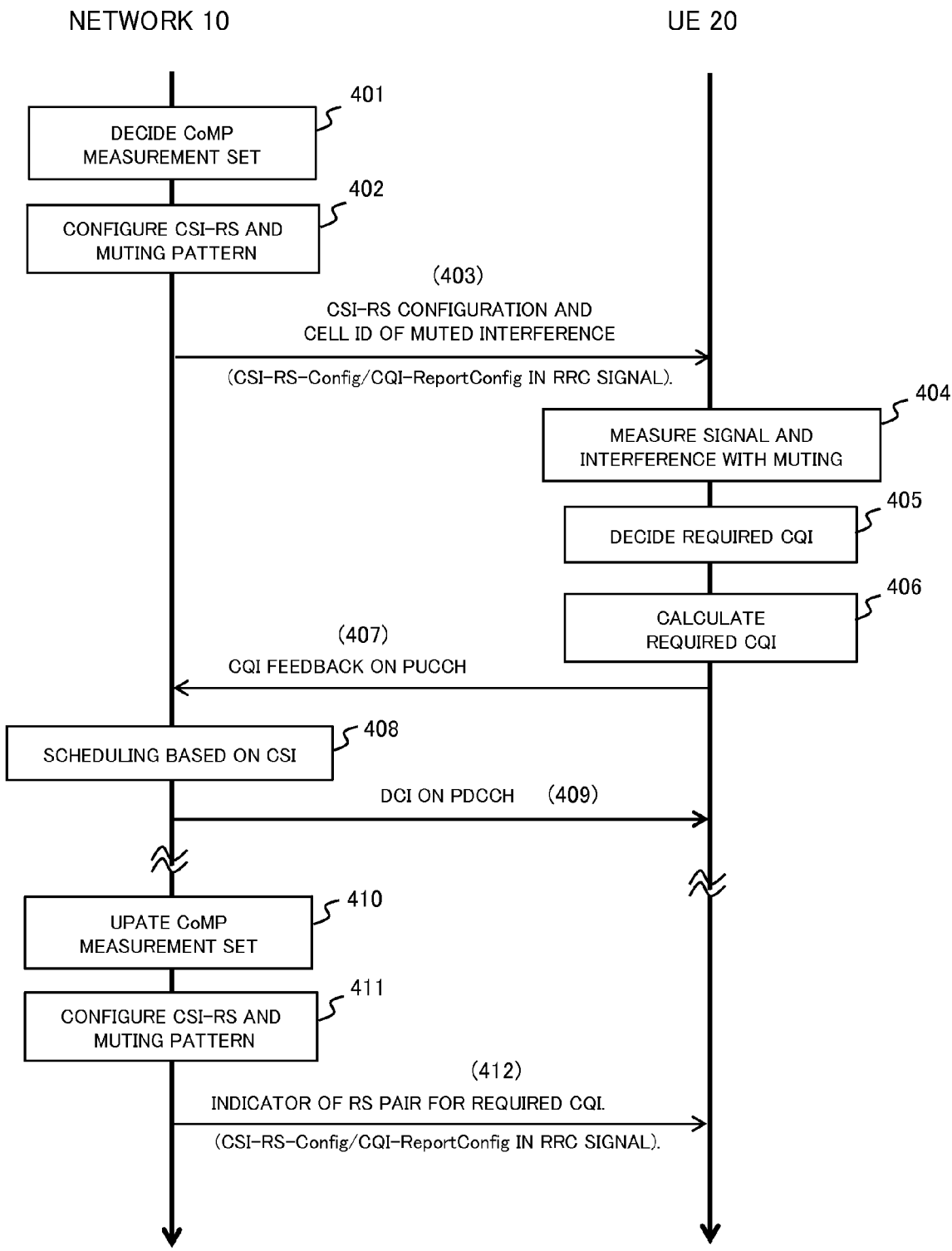

THIRD EXAMPLE

INFORMATION ELEMENTS IN RRC SIGNAL

{ CSI-RS1, CSI-RS2, CSI-RS3 }

{ ZP-CSI-RSa, ZP-CSI-RSb, ZP-CSI-RSc, ZP-CSI-RSd, }

CSI-RS CONFIGURATION

| MUTING PATTERN | CELL ID OF MUTED INTERFERENCE |
|---|---|
| Ma for ZP-CSI-RSa | CELL1, CELL2 |
| Mb for ZP-CSI-RSb | CELL1, CELL3 |
| Mc for ZP-CSI-RSc | CELL2, CELL3 |
| Md for ZP-CSI-RSd | CELL1, CELL2, CELL3 |

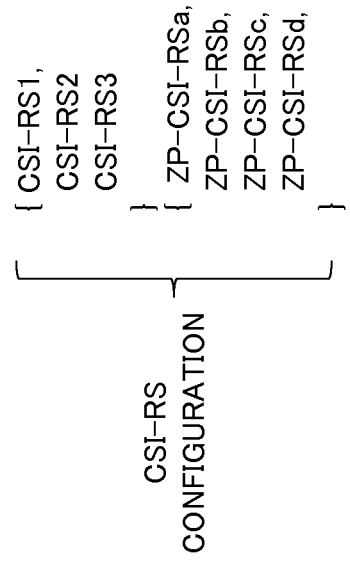

FIG. 12
THIRD ILLUSTRATIVE EMBODIMENT
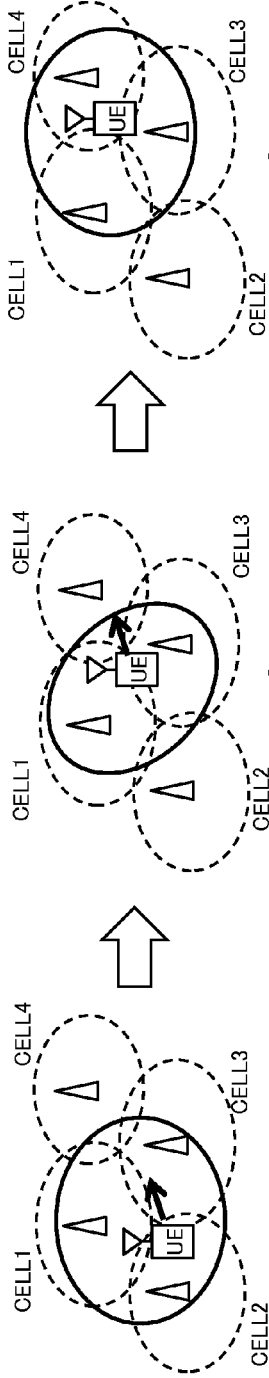
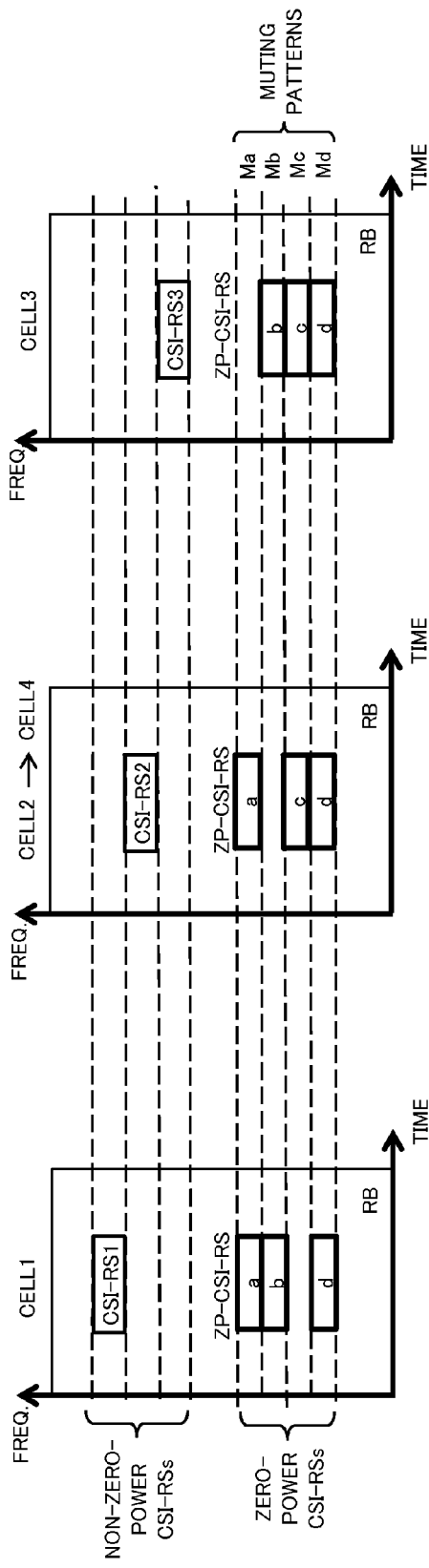

FIG. 13

FIFTH EXAMPLE

| TIME | t0 | t1 | t2 |
|---|---|---|---|
| CoMP measurement set | Cell 1,2,3 | Cell1,3 | Cell1,4, 3 |
| Non-zero-power CSI-RS | CSI-RS1,2,3 | CSI-RS1, ~~2~~, 3 | CSI-RS1, 4, 3 |
| Zero-power CSI-RS | ZP-CSI-RSa, b, c, d | ZP-CSI-RS~~a~~, b, ~~c, d~~ | ZP-CSI-RSa, b, c, d |
| Information elements in RRC signal: RS pair of required CQI | (CSI-RS1/2, ZP-CSI-RSa) (CSI-RS1/3, ZP-CSI-RSb) (CSI-RS2/3, ZP-CSI-RSc) (CSI-RS1/2/3, ZP-CSI-RSd) | (CSI-RS1/3, ZP-CSI-RSb) | (CSI-RS1/2, ZP-CSI-RSa) (CSI-RS1/3, ZP-CSI-RSb) (CSI-RS2/3, ZP-CSI-RSc) (CSI-RS1/2/3, ZP-CSI-RSd) |
| Information elements in RRC signal: additional RS pair of required CQI compared to previous RRC signal | (CSI-RS1/2, ZP-CSI-RSa) (CSI-RS1/3, ZP-CSI-RSb) (CSI-RS2/3, ZP-CSI-RSc) (CSI-RS1/2/3, ZP-CSI-RSd) | | |

FIG. 14

SIXTH EXAMPLE

| time | t0 | t1 | t2 |
|---|---|---|---|
| CoMP measurement set | Cell 1,2,3 | Cell1,3 | Cell1,4, 3 |
| Non-zero-power CSI-RS | CSI-RS1,2,3 | CSI-RS1, 2̶,̶3 | CSI-RS1, *4*, 3 |
| Zero-power CSI-RS | ZP-CSI-RSa, b, c, d | ZP-CSI-RSa̶, b,c̶,d̶ | ZP-CSI-RS*a*, b, *c*, *d* |
| Information elements in RRC signal (RS pair of not required CQI) | (CSI-RS3, ZP-CSI-RSa) (CSI-RS2, ZP-CSI-RSb) (CSI-RS1, ZP-CSI-RSc) | - | (CSI-RS3, ZP-CSI-RSa) (CSI-RS2, ZP-CSI-RSb) (CSI-RS1, ZP-CSI-RSc) |
| Information elements in RRC signal (additional RS pair of not required CQI compared to previous RRC signal) | (CSI-RS3, ZP-CSI-RSa) (CSI-RS2, ZP-CSI-RSb) (CSI-RS1, ZP-CSI-RSc) | | |

FIG. 15

SEVENTH EXAMPLE

| time | t0 | t1 | t2 |
|---|---|---|---|
| CoMP measurement set | Cell 1,2,3 | Cell1,3 | Cell1,4, 3 |
| Non-zero-power CSI-RS | CSI-RS1,2,3 | CSI-RS1, 2, 3 | CSI-RS1, 4, 3 |
| Zero-power CSI-RS | ZP-CSI-RSa, b, c, d | ZP-CSI-RSa, b, c, d | ZP-CSI-RSa, b, c, d |
| Information elements in RRC signal (muting pattern list of muted cell indexes) | Ma: Cell1, 2 IDs<br>Mb: Cell1, 3 IDs<br>Mc: Cell2, 3 IDs<br>Md: Cell1, 2, 3 IDs | Mb: Cell1, 3 IDs | Ma: Cell1, 4 IDs<br>Mb: Cell1, 3 IDs<br>Mc: Cell4, 3 IDs<br>Md: Cell1, 4, 3 IDs |
| Information elements in RRC signal (additional muting pattern list of muted cell indexes compared with previous RRC signal) | Ma: Cell1, 2 IDs<br>Mb: Cell1, 3 IDs<br>Mc: Cell2, 3 IDs<br>Md: Cell1, 2, 3 IDs | | Ma: Cell1, 4 IDs<br>Mc: Cell4, 3 IDs<br>Md: Cell1, 4, 3 IDs |

FIG. 16

EIGHTH EXAMPLE

| time | t0 | t1 | t2 |
|---|---|---|---|
| CoMP measurement set | Cell 1,2,3 | Cell1,3 | Cell1,4,3 |
| Non-zero-power CSI-RS | CSI-RS1,2,3 | CSI-RS1,2,3 | CSI-RS1, *4*, 3 |
| Zero-power CSI-RS | ZP-CSI-RSa, b, c, d | ZP-CSI-RSa, b, c, d | ZP-CSI-RSa, b, *c, d* |
| Information elements in RRC signal (muting pattern list of non-muted cell indexes) | Ma: Cell3 IDs<br>Mb: Cell2 IDs<br>Mc: Cell1 IDs<br>Md: - | Mb: - | Ma: Cell3 IDs<br>Mb: Cell4 IDs<br>Mc: Cell1 IDs<br>Md: - |
| Information elements in RRC signal (additional muting pattern list of non-muted cell indexes compared with previous RRC signal) | Ma: Cell3 IDs<br>Mb: Cell2 IDs<br>Mc: Cell1 IDs<br>Md: - | | Mb: Cell4 IDs |

FIG. 17
CoMP MEASUREMENT SET:
Cell1, 2, 3
| Per CSI-RS resource CQI | CSI-RS1 | 2 | 3 |
|---|---|---|---|
| ZP-CSI-RSa | S1/Ia | S2/Ia | - |
| b | S1/Ib | - | S3/Ib |
| c | - | S2/Ic | S3/Ic |
| d | S1/Id | S2/Id | S3/Id |
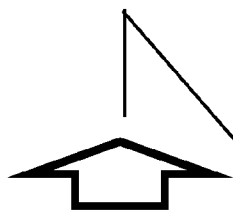
CoMP MEASUREMENT SET:
Cell1, 3
| | 1 | 3 |
|---|---|---|
| b | S1/Ib | S3/Ib |
CoMP MEASUREMENT SET:
Cell1, 4, 3
| | 1 | 2 | 3 |
|---|---|---|---|
| a | S1/Ia | S2/Ia | - |
| b | S1/Ib | - | S3/Ib |
| c | - | S2/Ic | S3/Ic |
| d | S1/Id | S2/Id | S3/Id |

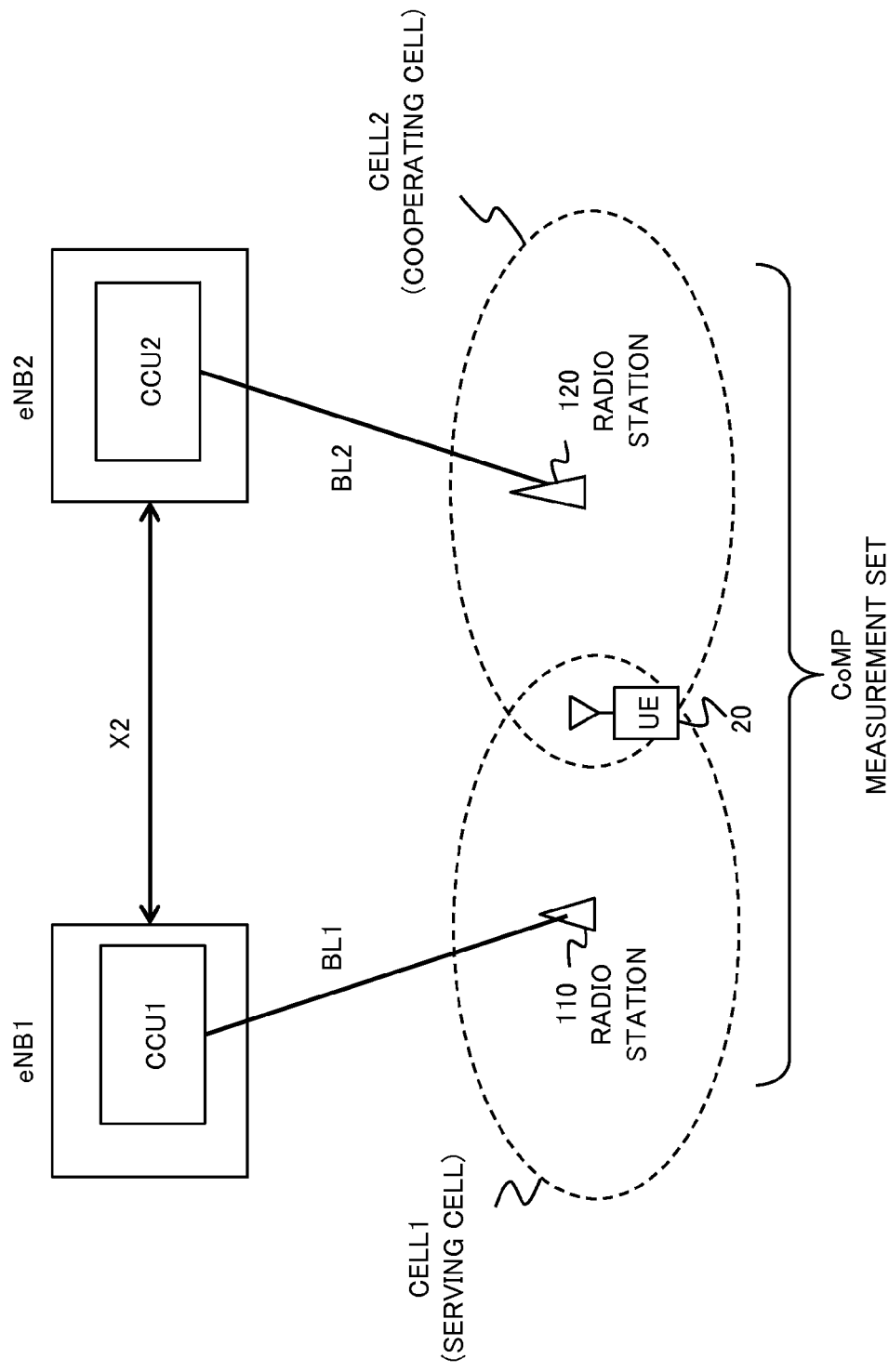

RADIO COMMUNICATION SYSTEM AND METHOD

CROSS-REFERENCE TO RELATED PATENT APPLICATIONS

This application is a National Stage Entry of International Application No. PCT/JP2012/000563, filed Jan. 30, 2012. The entire content of the above-referenced application is expressly incorporated herein by reference.

BACKGROUND

The present invention relates generally to a radio communication system and, more specifically, to techniques of controlling the feedback operation of a user terminal in coordinated multi-point (CoMP) transmission/reception schemes.

Coordinated multi-point transmission/reception is considered in LTE (Long Term Evolution)-Advanced Release 11(Rel. 11) as a tool to improve the coverage of high data rates, the cell-edge throughput, and also to increase system throughput as described in the Sect. 4 of 3GPP TR 36.819 v11.0.0, Coordinated multi-point operation for LTE physical layer aspects (Release 11) (hereinafter referred to as "NPL 1"). The CoMP schemes, joint transmission (JT), dynamic point selection (DPS), and coordinated scheduling/coordinated beamforming (CS/CB) have been agreed to be supported as described in the Sect. 5.1.3 of NPL1. In case of JT and DPS, data for a user equipment (UE) is available at more than one point in the CoMP cooperating set, which is defined in the Sect. 5.1.4 of NPL1 as a set of (geographically separated) points directly and/or indirectly participating in data transmission to a UE in time-frequency resource. In case of CS/CB, data for a UE is only available at and transmitted from the one point (serving point) but user scheduling/beamforming decisions are made with coordinated among points corresponding to the CoMP cooperating set. It should be noted that the term "point" for coordinated multi-point transmission/reception can be used as a radio station, a transmission/reception unit, remote radio equipment (RRE) or distributed antenna of a base station, Node-B or eNB. Accordingly, in the present disclosure, a point, a radio station, a transmission/reception unit and a cell may be used synonymously.

For JT, multiple transmission points (TPs) are selected for simultaneous data transmission and the interference comes from the points other than the selected TPs. For DPS, only one TP is dynamically selected and the interference comes from the points other than the only selected TP. While, for CB/CS, the serving point is the only TP to transmit data but the strong interference from the neighbor cell is reduced significantly. Therefore, the employment of different CoMP schemes results in variable types of interferences.

It has been decided to standardize a common feedback framework that can support CoMP JT, DPS and CB/CS, as stated in the Sect. 5.2.2 of NPL1. For channel-dependent scheduling to support all the above CoMP schemes, CoMP measurement set is defined in the Sect. 5.1.4 of NPL1 as a set of points about which channel state/statistical information (CSI) related to their link to the UE is measured and/or reported, where the channel quality information (CQI) considering the interference power with muting on different cells in the CoMP measurement set needs to be estimated at UE side and fed back by the UE to the network.

In Rel. 8/9, cell-specific reference signal (CRS) is used for CSI measurement. The interference measurements are left completely unspecified with UE behavior. In Rel. 10, non-zero-power CSI-RS and zero-power CSI-RS have been introduced for CSI measurement of single cell downlink transmission as described in the Sect. 6.10.5.2 of 3GPP TS 36.211 v10.3.0, Physical Channels and Modulation of Evolved Universal Terrestrial Radio Access (E-UTRA) (Release 10) (hereinafter, referred to as "NPL2"). In Rel. 11 CoMP work item (WI), it has been proposed to use multiple non-zero-power CSI-RS over orthogonal resources to measure signals from multiple points in the CoMP measurement set.

Also it has been proposed to specify the interference measurement resources, such as zero-power CSI-RS in R1-114260, Ericsson, ST-Ericsson (hereinafter, referred to as "NPL3") or PDSCH muting resource elements (REs) in R1-114228, Samsung (hereinafter, referred to as "NPL4"), to measure part of the intra- and inter-CoMP cluster interferences by configuring variable muting patterns for the points in the CoMP measurement set.

According to the Sect. 6.3.2 of 3GPP TS 36.331 v10.3.0, Radio resource control (RRC) and Protocol specification of Evolved Universal Terrestrial Radio Access (E-UTRA) (Release 10) (hereinafter, referred to as "NPL5"), the serving point semi-statically informs the UE of only the resource location, i.e., the resource element (RE) index and subframe index, of non-zero-power CSI-RS and zero-power CSI-RS as the information element of CSI-RS-Config by radio resource control (RRC) signaling. For multi-point signal power measurement by using multiple non-zero-power CSI-RSs, the additional information, such as the cell identity (ID) of each cell in the CoMP measurement set, may also be needed for UE detection, when non-zero-power CSI-RSs are generated by using cell-specific scrambling sequences as stated in R1-114318, Nokia Siemens Networks, Nokia (hereinafter, referred to as "NPL6"), where the physical cell ID is used to generate the initialization value of the cell-specific scrambling sequence, as defined in the Sect.6.8.2 of NPL2.

In order to explain problems to be solved by the present invention, a simple example for a system with the employment of CoMP is given in FIG. 1. Referring to FIG. 1, it is assumed that a UE is served by Cell1 and a CoMP measurement set is composed of the serving cell (Cell1) and cooperating cells (Cell2 and Cell3). The Cell1, Cell2 and Cell3 are managed by a central control unit (CCU) through backhaul links BL1, BL2 and BL3, respectively.

As shown in FIG. 2A, the CCU configures orthogonal non-zero-power CSI reference signals CSI-RS1, CSI-RS2 and CSI-RS3 for Cell1, Cell2 and Cell3, respectively. Moreover, the zero-power CSI-reference signals ZP-CSI-RSa, ZP-CSI-RSb, ZP-CSI-RSc and ZP-CSI-RSd are also configured to measure the interference with muting on different cells, where the muting patterns on different zero-power CSI-RS resources are indicated by Ma, Mb, Mc and Md, respectively. In the muting pattern Ma, the signal power of Cell1 and Cell2 are muted; in the muting pattern Mb, the signal power of Cell1 and Cell3 are muted; and in the muting pattern Mc, the signal power of Cell2 and Cell3 are muted; in case of Md, the signal power of Cell1~3 is muted. When the signal power of a Cell is muted, the interference from that Cell can be eliminated from consideration about interference at UE. Accordingly, in the muting pattern Md, the interferences within the CoMP measurement set are all excluded.

As shown in FIG. 2B, the UE is informed of configuration information of CSI-RS1, CSI-RS2 and CSI-RS3 including their resource positions defined by RE index and subfame index as well as the corresponding cell ID. Based on the configuration information, the UE can measure the signal power per cell: S1, S2 and S3. Furthermore, with the knowledge of the resource positions of zero-power (ZP)-CSI-RSa, ZP-CSI-RSb, ZP-CSI-RSc and ZP-CSI-RSd, the UE can calculate the interference power Ia, Ib, Ic, Id according to the muting patterns Ma, Mb, Mc and Md by measuring and averaging the received power at the informed positions of ZP-CSI-RSs as follows:

Muting pattern Ma: Ia=average(0+0+S3+N)
Muting pattern Mb: Ib=average(0+S2+0+N)
Muting pattern Mc: Ic=average(S1+0+0+N)
Muting pattern Md: Id=average(0+0+0+N)

where N represents the interferences from outside the CoMP measurement set plus the additive white Gaussian noise (AWGN).

Thereafter, the per-CSI-RS-resource CQI considering muted interferences for CoMP can be calculated at the UE as shown in FIG. 2(C).

Since the network informs the UE of only the RE positions of CSI-RSs, the UE cannot know which cell's signal is counted for CQI calculation and therefore uses all interferences to calculate CQI as shown in FIG. 2C. For example, the signal power S1 for Cell1 measured at the UE is not muted in the muting pattern Mc and therefore the calculation Ic=aver(S1+N) does not reflect actual interference at the resource of CSI-RS1.

However, since the UE is informed of only the RE positions of CSI-RSs, the calculation Ic=average(S1+N) is assumed to be counted, resulting in a wrong CQI, such as S1/Ic. Similar case would happen if S2/Ib=S2/average(S2+N) and S3/Ia=S3/average(S3+N) are measured and reported as shown in FIG. 2(C). The calculation and feedback of a wrong CQI may result in useless power consumption and unnecessary feedback overhead.

An object of the present invention is to provide a method and system which allow efficient measurement and feedback of CQI for CoMP scheduling.

SUMMARY

According to the present invention, a radio communication system includes a network and a user terminal, wherein the network includes a plurality of radio stations and a controller which controls the plurality of radio stations, wherein at least two of the plurality of radio stations are communicating with the user terminal, wherein the controller notifies the user terminal of information about resource for interference measurement, wherein the user terminal calculates and reports channel quality information based on the information.

According to the present invention, a communication method in a radio communication system comprising a network and a user terminal, wherein the network comprises a plurality of radio stations and a controller which controls the plurality of radio stations, the method includes the steps of: setting at least two of the plurality of radio stations to communicate with the user terminal; and notifying the user terminal of information about resource for interference measurement, wherein the user terminal calculates and reports channel quality information based on the information.

A control device for controlling a plurality of radio stations in a radio communication system, includes: a measurement set decision section for setting at least two of the plurality of radio stations communicating with the user terminal; and a controller for notifying the user terminal of information about resource for interference measurement, wherein the user terminal calculates and reports channel quality information based on the information.

A user terminal in a radio communication system comprising a plurality of radio stations and a network controller which controls the plurality of radio stations, includes: a radio communication section for communicating with at least two of the plurality of radio stations; a measurement section for measuring interference according to information about resource for interference measurement received from the network controller; and a controller for calculating reporting channel quality information based on the information.

Advantageous Effects of Invention

According to the present invention, unnecessary calculation of not required CQI at UE side can be avoided and unnecessary feedback overhead can be reduced. The corresponding power consumption for unnecessary calculation and feedback is therefore avoided.

For a more complete understanding of the present disclosure and its advantages, reference is now made to the following description taken in conjunction with the accompanying drawings, in which like reference numerals represent like parts:

BRIEF DESCRIPTION OF DRAWINGS

FIG. 2B is a schematic diagram illustrating the informed resource positions of non-zero-power CSI-RS and zero-power CSI-RS at a UE in the radio communication system as shown in FIG. 1.

FIG. 2C is a diagram showing an example of CQI calculation per CSI-RS.

FIG. 3 is a schematic diagram illustrating the configuration of non-zero-power CSI-RS and ZP-CSI-RS in a network and per-CSI-RS-resource CQIs with muted interference at UE in order to explain an outline of the present invention.

FIG. 4 is a block diagram illustrating a radio communication system according to a first illustrative embodiment.

FIG. 5 is a sequence diagram illustrating a first example of operations of the network and the UE in the radio communication system of FIG. 4.

FIG. 6A is a diagram illustrating the information of CSI-RS configuration and a RS pair list for required CQI included in the information elements in RRC signal in the first example of FIG. 5.

FIG. 6B is a schematic diagram illustrating a correspondence between non-zero-power CSI-RS and zero-power CSI-RS for Cell1 in the first example of FIG. 5.

FIG. 6C is a diagram illustrating the combined information of the RS pair list and the CSI-RS configuration as shown in FIG. 6A FIG. 7 is a sequence diagram illustrating a second example of operations of the network and the UE in the radio communication system of FIG. 4.

FIG. 8B is a schematic diagram illustrating a correspondence between non-zero-power CSI-RS and zero-power CSI-RS for Cell1 in the first example of FIG. 5.

FIG. 9 is a block diagram illustrating a radio communication system according to a second illustrative embodiment.

FIG. 10 is a sequence diagram illustrating a third example of operations of the network and the UE in the radio communication system of FIG. 9.

FIG. 11B is a diagram illustrating the information of CSI-RS configuration and a correspondence between muting pattern and non-muted cell ID in a fourth example of operations of the network and the UE in the radio communication system of FIG. 9.

FIG. 12 is a schematic diagram illustrating a change of CoMP measurement set and the corresponding updated CSI-RS and ZP-CSI-RS configuration in a radio communications system according to a third illustrative embodiment of the present invention.

FIG. 13 is a table illustrating the RS pairs of required CQI in case of updated CoMP measurement set in a radio communication system according to the first example.

FIG. 14 is a table illustrating the RS pairs of not-required CQI in case of updated CoMP measurement set in a radio communication system according to the second example.

FIG. 15 is a table illustrating the interference muting pattern with muted cell indexes in case of updated CoMP measurement set in a radio communication system according to the third example.

FIG. 16 is a table illustrating the interference muting pattern with non-muted cell indexes in case of updated CoMP measurement set in a radio communications system according to the fourth example.

FIG. 17 is a table illustrating per-CSI-RS-resource CQI with muted interferences in case of updated CoMP measurement set in a radio communication system according to the third illustrative embodiment.

FIG. 18 is a schematic diagram illustrating a radio communication system according to a fourth illustrative embodiment.

DETAILED DESCRIPTION

Hereinafter, illustrative embodiments of the present invention will be described by making references to the accompanied drawings. The embodiments used to describe the principle of the present invention are by way of illustration only and should not be construed in any way to limit the scope of the disclosure. Those skilled in the art will understand that the principles of the present disclosure may be implemented in any suitably arranged wireless network. Hereafter, the principle of the present invention will be described by referring to FIG. 3.

Figure 1:
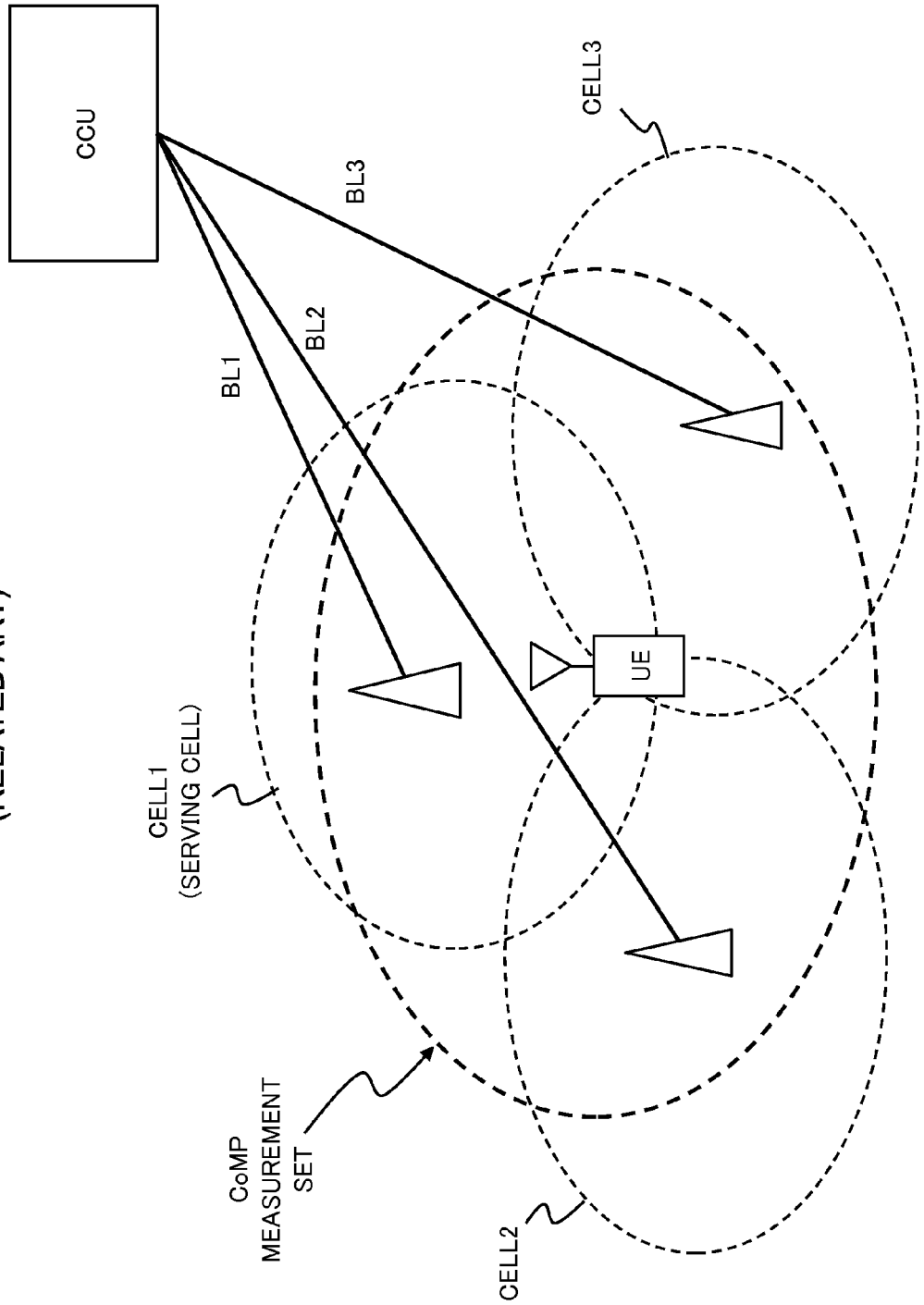
FIG. 1 is a schematic diagram illustrating an example of a radio communication system including a UE with its CoMP measurement set.
Figure 2A:
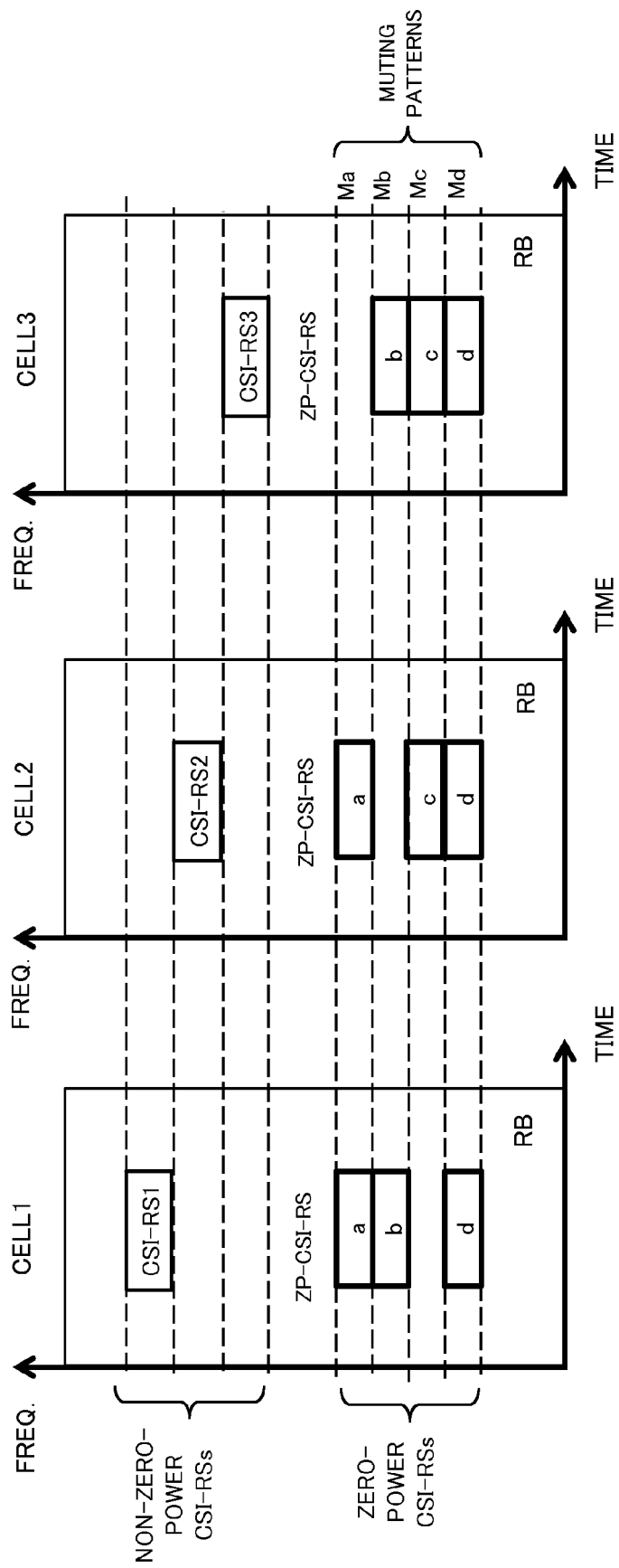
FIG. 2A is a schematic diagram illustrating the configuration of non-zero-power CSI-RS and zero-power CSI-RS for each cell in the radio communication system as shown in FIG. 1.

In FIG. 3, it is assumed that a network 10 includes Cell1, Cell2 and Cell3 which are managed by a CCU through backhaul links BL1-BL3, respectively; a UE 20 is served by the Cell1; and a CoMP measurement set is composed of the serving Cell1 and cooperating Cell2 and Cell3 as shown in FIG. 1. The CCU configures orthogonal non-zero-power CSI reference signals CSI-RS1, CSI-RS2 and CSI-RS3 for Cell1, Cell2 and Cell3, respectively. The zero-power CSI-reference signals ZP-CSI-RSa, ZP-CSI-RSb, ZP-CSI-RSc and ZP-CSI-RSd are also configured to measure the interference with muting on different cells as shown in FIG. 2.

According to illustrative embodiments which will be described below, the network 10 as shown in FIG. 3 notifies the UE 20 of information implicitly or explicitly indicating interference-measuring resources. More specifically, a signal for indicating the interference-measuring resources allows the UE 20 to select valid pairs of CSI-RS and ZP-CSI-RS as shown in FIG. 3. Taking the muting pattern Ma as an example, the signal power of Cell 1 and Cell2 are muted and therefore information about interference-measuring resources defined by combinations of ZP-CSI-RSa and each of CSI-RS1 and CSI-RS2 can be effectively used for CQI calculation. In other words, information about interference-measuring resources defined by combinations of ZP-CSI-RSa and CSI-RS3 is not used for CQI calculation. Accordingly, the calculation and feedback of a wrong CQI can be effectively avoided, resulting in reduced unnecessary feedback overhead and efficient calculation of CQI for CoMP scheduling.

1. First Illustrative Embodiment

According to the first illustrative embodiment, an explicit signaling method is employed, such that the network notifies the UE of information about resource pairs allowing CQI calculation. Detailed configuration and operation will be described by referring to FIGS. 4-8.

1.1) System Configuration

As shown in FIG. 4, it is assumed that a radio communication system according to the first illustrative embodiment is composed of a network 10 and a UE 20, wherein the network 10 is comprised of multiple enhanced Node-Bs (eNBs) and each eNB includes a central control unit (CCU) 100 which controls a serving radio station 110 (corresponding to Cell1) and other cooperating radio stations (corresponding to Cell2 and Cell3) through backhaul links BL1, BL2 and BL3, respectively. Here, the eNB is a centralized station which controls multiple cells or low power nodes (LPNs) through backhaul links. The intra-eNB CoMP is carried out with the control area of eNB. In case of inter-eNB CoMP, a UE is connected to multiple eNBs and the information exchanged between eNBs is exchanged through X2 backhaul. In the following, the intra-eNB CoMP is illustrated for better undersanding the function of CCU 100. As described before, in the present disclosure, a point, a radio station, a cell and a transmission/reception unit are used synonymously.

The CCU 100 includes the function blocks of: CoMP measurement set decision section 101; CSI-RS and muting pattern configuration section 102; RS pair decision section 103 for calculating required or not required CQI for UE measurement and reporting; a joint scheduler 104 for multiple transmission points; a backhaul link (BL) communication section 105; and a controller 106. Each radio station in CoMP measurement set is communicating with the UE 20 and includes the function blocks of: BL communication section 111; controller 112; radio transmitter 113; and radio receiver 114. The UE 20 includes the function blocks of: radio transmitter 201; radio receiver 202; DL signal and interference measurement section 203; CQI calculation section 204; and a controller 205.

By using the above-mentioned function blocks, the network 10 can decide non-zero-power/zero-power CSI-RS configuration as well as the RS pairs of required or not required CQI for CoMP scheduling. The UE 20 is informed, by the network 10, of the CSI-RS configuration together with the RS pair list. The UE can measure the signal power and interference power with muting by using the configured non-zero-power CSI-RS and zero-power CSI-RS, respectively. Thereafter, the UE 20 calculates the required CQI based on the informed RS pair list and finally feeds back the calculated CQI through UL channel to the network 10.

1.2) First Example

A first example of the communication method according to the first illustrative embodiment employs the signaling of the RS pairs of required CQI. The network 10 decides CSI-RS configuration as well as required CQI and then explicitly sends the UE 20 a signal indicating a correspondence between the signal power measured on non-zero-power CSI-RS and interference power measured on zero-power CSI-RS for calculation of the required CQI. The first example will be described hereinafter.

Referring to FIG. 5, at the network 10, the CoMP measurement set decision section 101 of the CCU 100 decides the CoMP measurement set for the target UE 20 (operation 301). In this example, the CoMP measurement set includes the radio station 110 and the cooperating radio stations, namely Cell1, Cell2 and Cell3. Next, the CSI-RS and muting pattern configuration section 102 configures non-zero-power CSI-RSs (CSI-RS1, CSI-RS2, CSI-RS3) for Cell1, Cell2 and Cell3 over orthogonal resource elements (REs) and zero-power CSI-RSs (ZP-CSI-RSa, ZP-CSI-RSb, ZP-CSI-RSc, ZP-CSI-RSd) with different muting patterns (Ma, Mb, Mc, Md) as given in FIG. 3 (operation 302). Subsequently, the RS pair decision section 103 decides the RS pairs for calculating required CQI as shown in FIG. 6A and FIG. 6B (operation 303) and under the control of the controller 106, the backhaul link communication section 105 sends an indicator of the RS configuration plus the RS pair list for the required CQI to the UE 20 via the serving radio station 110 (operation 304). In the RRC signal CSI-RS-Config defined in NPL5, the information of CSI-RS configuration for a non-zero-power CSI-RS and a zero-power CSI-RS at serving cell has already defined for single-point transmission. By using simple extension, the information of CSI-RS configuration for multiple non-zero-power CSI-RS and multiple zero-power CSI-RS is illustrated in FIG. 6A. The RS pair list is the additional information and should be work together with the CSI-RS configuration. The separate information of the above RS pair list and the CSI-RS configuration in FIG. 6A may be combined together as the information illustrated in FIG. 6C, which is sent from the network 10 to the UE 20.

The information of RS configuration is stored as the indicator in the information elements of a RRC signal CSI-RS-Config. The information of the above RS pairs can be also stored as the indicator in the information elements of a RRC signal CSI-RS-Config or separately stored as the indicator in the information elements of a RRC signal CQI-Report-Config. Both RRC signals are defined in the Sect. 6.3.2 of NPL5. Such RRC signals will be generated in the controller 112 and semi-statically (e.g., 120 ms, 240 ms, etc.) informed to the target UE 20 through the transmitter 113 at the serving radio station 110 (Cell1). The configured non-zero-power and zero-power CSI-RSs, also generated in the controller 112 of each cell in the CoMP measurement set, are sent to the UE 20 periodically with a shorter period (e.g., 5 ms, 10 ms, etc.) than that of RRC signal.

At the UE 20, when the radio receiver 202 receives the DL signal from the radio station 110, the signal and interference measurement section 203 detects the non-zero power CSI-RS according to the RRC signal to measure the per-cell signal power and measure the received power at the position of zero-power CSI-RS to obtain the interference power with muting (operation 305). The CQI calculation section 204 uses the measured signal power and interference power with muting to calculate only the required CQI according to the informed RS pair list (operation 306). Next, the UL signal including the calculated CQI as well as other estimated CSI is generated and then fed back by radio transmitter 201 through uplink channel, such as PUCCH (physical uplink control channel) or PUSCH (physical uplink shared data channel) (operation 307). At the radio station 110, the CQI feedback received by the radio receiver 114 is transferred over the backhaul link BL1 to the CCU 100.

At the CCU 100, when receiving the CQI feedback, the controller 106 controls the joint scheduler 104 for transmission point (TP) selection, resource allocation and precoding vector selection for each TP (operation 308). The scheduling results are shared by the radio station 110 and the cooperating radio stations (Cell1, Cell2 and Cell3) through the backhaul links BL1-BL3. Finally, the downlink control information, including part of dynamic scheduling results is generated at the serving radio station 110 and transmitted by the radio transmitter 113 through downlink control channel, such as PDCCH (physical downlink control channel) or enhanced PDCCH (ePDCCH). Based on dynamic scheduling results, the downlink data for the UE 20 is generated at the radio station(s) of selected TP(s) and transmitted by the radio transmitter 113 through downlink data channel, i.e., PDSCH (physical downlink shared data channel) (operation 309). As an example, the control signal is sent through PDCCH or ePDCCH from the serving point only. It is also possible to send the control signal from a selected TP different from the serving point or multiple selected TPs, where the selected TP(s) may be different from those of data transmission.

When the CoMP measurement set is changed due to movement of the UE 20, the CoMP measurement set decision section 101 updates CoMP measurement set for the target UE 20 (operation 310). Since operations following the operation 310 including operations 311-313 are similar to the operations 302-309 as described above, their descriptions are omitted.

1.3) Second Example

A second example of the communication method according to the first illustrative embodiment employs signaling of RS pairs of not-required CQI. The network 10 decides CSI-RS configuration as well as the RS pairs of not-required CQI and then explicitly sends the UE 20 a list of RS pairs for not-required CQI to avoid the calculation of wrong CQI. According to the second example, an indicator of RS pair list for not-required CQI is sent from the network 10 to the UE 20, which is the main point of difference between the first example and the second example. Accordingly, hereinafter, the second example will be described mainly regarding the difference.

Figure 8A:
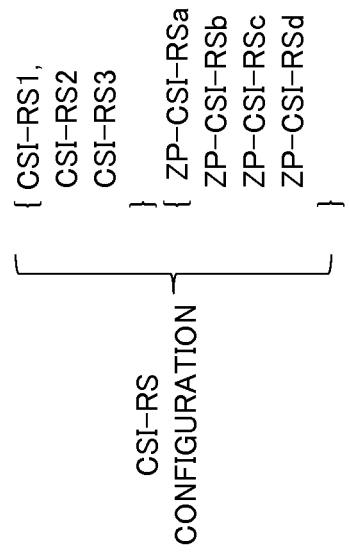
FIG. 8A is a diagram illustrating the information of CSI-RS configuration and a RS pair list for not-required CQI included in the information elements in RRC signal in the first example of FIG. 5.

Referring to FIG. 7, at the network 10, the CoMP measurement set decision section 101 and the CSI-RS and muting pattern configuration section 102 perform the operations 301 and 302, respectively. Subsequently, the RS pair decision section 103 decides the RS pairs for not-required CQI as shown in FIG. 8A and FIG. 8B (operation 303*a*) and under the control of the controller 106, the backhaul link communication section 105 sends an indicator of the CSI-RS configuration plus the RS pair list for not-required CQI to the UE 20 via radio station(s) (operation 304*a*). The information of such a RS pair list is included in the information elements in the RRC signal CQI-Report-Config or CSI-RS-Config and sent semi-statically to the UE.

At the UE 20, the signal and interference measurement section 203 measures the per-cell signal power and the interference power with muting (operation 305). The CQI calculation section 204 calculates the CQI by using all the combinations of the RS pairs except that of the not-required CQI corresponding to the informed RS pairs (operation 306). After that, the UE 20 feeds back the calculated CQI to the network 10 (operation 307).

In this manner, the UE 20 does not feed the non-required CQI back to the network 10 by referring to the indicator of RS pairs for not-required CQI, resulting in reduced unnecessary feedback overhead and efficient calculation of CQI for CoMP scheduling. Compared to the first example, the second example can achieve further reduced amount of the indicator transmitted from the network to the UE.

2. Second Illustrative Embodiment

Figure 11A:
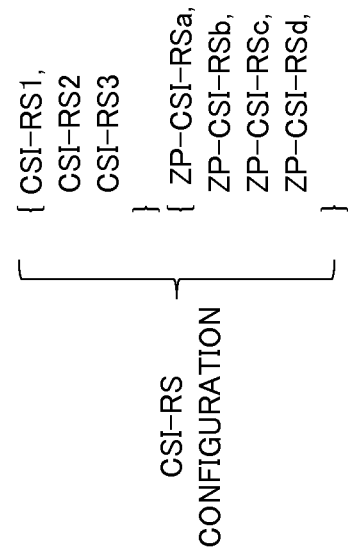
FIG. 11A is a diagram illustrating the information of CSI-RS configuration and muted cell IDs included in the information elements in RRC signal in the third example of FIG. 10.

According to the second illustrative embodiment, an implicit signaling method is employed such that the network notifies the UE 20 only information about cell indexes (IDs) of muted or non-muted interference, which is used to decide and calculate required CQI at the UE. Detailed configuration and operation will be described by referring to FIGS. 9-11.

2.1) System Configuration

As shown in FIG. 9, a CCU 100a and a UE 20a are different in functional structure from the CCU 100 and the UE 20 of the first illustrative embodiment shown in FIG. 4. More specifically, according to the second illustrative embodiment, instead of the CCU 100a, the UE 20a is provided with the function of deciding RS pairs for required CQI according to the implicit signaling, which is the main point of difference between the first and second illustrative embodiments. Accordingly, hereinafter, blocks similar to those previously described with reference to FIG. 4 are denoted by the same reference numerals and their descriptions will be omitted appropriately.

The CCU 100a includes the function blocks of: CoMP measurement set decision section 101; CSI-RS and muting pattern configuration section 102; a joint scheduler 104 for multiple transmission points; a backhaul link (BL) communication section 105; and a controller 106. Each radio station in CoMP measurement set is communicating with the UE 20a and includes the function blocks of: BL communication section 111; controller 112; radio transmitter 113; and radio receiver 114. The UE 20a includes the function blocks of: radio transmitter 201; radio receiver 202; DL signal and interference measurement section 203; CQI calculation section 204; a controller 205; and a required CQI decision section 206 for deciding the required CQI for UE measurement and reporting.

By using the above-mentioned function blocks, the network 10 can decide non-zero-power/zero-power CSI-RS configuration and informs the UE 20a of the CSI-RS configuration together with an interference muting pattern list, which suggests the relation between the signal power measured on non-zero-power CSI-RS and the interference power measured on zero-power CSI-RS. The UE 20a can measure the signal power and interference power with muting based on the configured non-zero-power CSI-RS and zero-power CSI-RS. Thereafter, the UE 20a decides the required CQI among the multiple candidates of CQI by using the informed interference muting pattern list; and then calculates and feeds back the required CQI through UL channel to the network 10.

2.2) Third Example

A third example of the communication method according to the second illustrative embodiment employs the signaling of the muting pattern list with muted cell indexes. The network 10 decides CSI-RS configuration and semi-statically sends the CSI-RS configuration together with the interference muting pattern list of muted cell indexes to the UE 20a. The UE 20a, when receiving the list, decides and calculates the required CQI by using the informed information of the interference with muting. The third example will be described hereinafter.

Referring to FIG. 10, at the network 10, the CoMP measurement set decision section 101 of the CCU 100a decides the CoMP measurement set for the target UE 20 (operation 401). In this example, the CoMP measurement set includes the radio station 110 and the cooperating radio stations, namely Cell1, Cell2 and Cell3. Next, the CSI-RS and muting pattern configuration section 102 configures non-zero-power CSI-RSs (CSI-RS1, CSI-RS2, CSI-RS3) for Cell1, Cell2 and Cell3 over orthogonal resource elements (REs) and zero-power CSI-RSs (ZP-CSI-RSa, ZP-CSI-RSb, ZP-CSI-RSc, ZP-CSI-RSd) with different muting patterns (Ma, Mb, Mc, Md) as given in FIG. 3 (operation 402). The interference muting pattern list of the zero-power CSI-RSs is given in FIG. 11A, which lists up the muted cell IDs.

Subsequently, the backhaul link communication section 105 sends the CSI-RS configuration plus the interference muting pattern list to the UE 20a via the serving radio station 110 (operation 403).

The information of CSI-RS configuration is stored as the indicator in the information elements of a RRC signal CSI-RS-Config. The information of the above interference muting pattern list can be also stored as the indicator in the information elements of a RRC signal CSI-RS-Config or separately stored as the indicator in the information elements of a RRC signal CQI-Report-Config. Both RRC signals are defined in the Sect. 6.3.2 of NPL5. Such RRC signals will be generated in the controller 112 and semi-statically (e.g., 120 ms, 240 ms, etc.) informed to the target UE 20a through the transmitter 113 at the serving radio station 110 (Cell1). The configured non-zero-power and zero-power CSI-RSs, generated in the controller 112 in each cell of the CoMP measurement set, are sent to the UE 20a periodically with a shorter period (e.g., 5 ms, 10 ms, etc.) than that of RRC signal.

At the UE 20a, when the radio receiver 202 receives the DL signal from the radio station 110, the signal and interference measurement section 203 detects reference signals RSs according to the RRC signal and measures the per-cell signal power and the interference power with muting (operation 404). The required CQI decision section 206 decides the required CQI with the knowledge of the informed interference muting patterns (operation 405). Thereafter the CQI calculation section 204 uses the measured signal power and interference power with muting to calculate the required CQI (operation 406). Next, the UL signal including the calculated CQI as well as other CSI is generated and then fed back by radio transmitter 201 through uplink channel, such as PUCCH (physical uplink control channel) (operation 407). At the radio station 110, the CQI feedback received by the radio receiver 114 is transferred over the backhaul link BL1 to the CCU 100a.

At the CCU 100a, when receiving the CQI feedback, the controller 106 controls the joint scheduler 104 for transmission point (TP) selection, resource allocation and precoding vector selection for each TP (operation 408). The scheduling results are shared by the radio stations in the CoMP measurement set, namely Cell1, Cell2 and Cell3, through the backhaul links BL1-BL3. Finally, the downlink control information, including part of dynamic scheduling results, is generated at the serving radio station 110 (Cell1) and transmitted by the radio transmitter 113 through downlink control channel, such as PDCCH or ePDCCH. Based on dynamic scheduling results, the downlink data for the UE 20*a* is generated at the radio station(s) of selected TP(s) and transmitted by the radio transmitter 113 through downlink data channel, i.e., PDSCH (physical downlink shared data channel) (operation 409). As an example, the control signal is sent though PDCCH or ePDCCH from the serving point only. It is also possible to send the control signal from a selected TP different from the serving point or multiple selected TPs, where the selected TP(s) may be different from those of data transmission.

When the CoMP measurement set is changed due to movement of the UE 20*a*, the CoMP measurement set decision section 101 updates CoMP measurement set for the target UE 20*a* (operation 410). Since operations following the operation 410 including operations 411-412 are similar to the operations 402-409 as described above, their descriptions are omitted.

2.3) Fourth Example

A fourth example of the communication method according to the second illustrative embodiment employs signaling of the muting pattern list of zero-power CSI-RSs with non-muted cell indexes as shown in FIG. 11B. The network 10 decides CSI-RS configuration and semi-statically sends the CSI-RS configuration together with the interference muting pattern list of non-muted cell indexes to the UE 20*a*. The UE 20*a*, when receiving the list, decides and calculates the required CQI by using the informed information of the non-muted cell indexes. According to the fourth example, a list of non-muted cell indexes is sent from the network 10 to the UE 20*a*, which is the main point of difference between the third example and the fourth example. The fourth example is also given by using the process similar to that of the third example as shown in FIG. 10 and therefore, hereinafter, will be described mainly regarding the difference.

At the operation 402 in FIG. 10, the CSI-RS and muting pattern configuration section 102 configures non-zero-power CSI-RSs (CSI-RS1, CSI-RS2, CSI-RS3) for Cell1, Cell2 and Cell3 over orthogonal resource elements (REs) and zero-power CSI-RSs (ZP-CSI-RSa, ZP-CSI-RSb, ZP-CSI-RSc, ZP-CSI-RSd) with different muting patterns (Ma, Mb, Mc, Md). The list of non-muted interference cell IDs is given in FIG. 11B. The list of non-muted cell IDs together with the CSI-RS configuration is informed to the target UE (operation 403).

The information of such a muting pattern list of zero-power CSI-RSs with non-muted cell IDs is stored in the information elements in a RRC signal CQI-Report-Config or CSI-RS-Config and semi-statically sent to the UE 20*a*. At the UE 20*a*, the required CQI for CoMP scheduling can be decided by using the informed muting pattern list and then calculated by using the measured signal and interference power with muting (operations 404-406). Since other operations are already described in FIG. 10, the details are omitted.

3. Third Illustrative Embodiment

In case of UE mobility and network traffic variation, the network has to update CoMP measurement set, where only part of the CoMP measurement set may change every time. For a updated CoMP measurement set, instead of redesigning the CSI-RS configuration and informing all information related to required CQI, the network preferably reuses the available CSI-RS configuration as much as possible and only sends a control signal to inform the UE of the information reflecting the varied part, which may simplify the network design and reduce the signaling overhead of repeated information. For better understanding, several examples are given as follows.

3.1) Update Of Comp Measurement Set

As shown in FIG. 12, it is assumed that the UE moves from Cell1 towards Cell4 through the overlapped area of Cell1 and Cell3 and, with this movement, its CoMP measurement set is updated. In this example, the CoMP measurement set at time t0 consists of Cell1, Cell2 and Cell3, which is updated as that of Cell1 and Cell3 at time t1 and finally updated as that of Cell1, Cell3 and Cell4 at time t2 due to UE mobility. With this UE movement, a corresponding CSI-RS and ZP-CSI-RS configuration is updated as shown in FIG. 12. It is assumed that CCU 100/100*a*, radio stations 110 and UE 20/20*a* have the same functional configurations as shown in FIG. 4 or FIG. 9.

3.2) Fifth Example

As shown in FIG. 13, a fifth example of the communication method according to the third illustrative embodiment employs the signaling of RS pair list for required CQI to provide reusing available CSI-RS configuration as much as possible in the case of updating the CoMP measurement set. Referring to the previous CSI-RS configuration for the CoMP measurement at time t0, the CSI-RS at time t1 is configured such that non-zero-power CSI-RSs (CSI-RS1, CSI-RS3) are reused to measure the signal power of Cell1 and Cell3, respectively; and the zero-power CSI-RS (ZP-CSI-RSb) with the muting pattern Mb is reused to measure the interference power excluding the interference from Cell1 and Cell4. The above CSI-RS configuration is updated at time t1 as FIG. 13 and indicated to the UE 20 by using RRC signal CSI-RS-Config. Accordingly, the RS pair list of required CQI, shown in FIG. 13, is decided by the RS pair decision section 103 (see FIG. 4), which can be sent using the information element of RRC signal CQI-Report-Config or CSI-RS-Config at time t1. At the UE 20, the required per CSI-RS-resource CQI, listed in FIG. 17, is calculated in the CQI calculation section 204 (see FIG. 4). Hereinafter, for simplicity, a plurality of CSI-RSs such as CSI-RS1, CSI-RS2 and CSI-RS3 are referred to as (CSI-RS1, 2, 3, . . . ).

At time t2, the CoMP measurement set is updated as Cell1, Cell4 and Cell3. Referring to the previous CSI-RS configuration at time t1, the CSI-RS at time t2 is configured in the CSI-RS and muting pattern configuration section 102 (see FIG. 4). As given in FIG. 12, non-zero-power CSI-RSs (CSI-RS1, 2, 3) are configured to measure the signal power of Cell1, Cell4 and Cell3, respectively; and zero-power CSI-RSs (ZP-CSI-RSa, b, c, d) with muting patterns (Ma, Mb, Mc, Md). The muting patterns (Ma, Mb, Mc) are designed to measure the interference power including no interference inside the CoMP measurement set except interferences from Cell3, Cell4, Cell1, respectively; and Md is used to exclude all the interferences from the CoMP measurement set. The above CSI-RS configuration is updated at time t2 as FIG. 13 and indicated to the UE 20 by using RRC signal CSI-RS-Config. Accordingly, the RS pair list of required CQI, illustrated also in FIG. 13, is decided in the RS pair decision section 103 (see FIG. 4) and can be sent as the information element of RRC signal CQI-Report-Config or CSI-RS-Config at time t2. According to the above information, the required per CSI-RS-resource CQI, also listed in FIG. 17, is calculated in the CQI calculation section 204 (see FIG. 4) at the UE 20.

It is to be noted that as illustrated in FIG. 13, the RRC signal of the RS pair list for required CQI at time t0 does not need to be repetitively sent again at time t1 and time t2 for the sake of control signal overhead reduction. At time t1, the RS pairs of CSI-RS1/3 and ZP-CSI-RSb are already included in the RRC signal of RS pairs for required CQI at time t0. At time t2, the RS pairs of required CQI related to (CSI-RS1, 2, 3) and (ZP-CSI-RSa, b, c, d) are the same as that of time t0. Therefore, the RS pair list does not need to be updated at time t1 and t2. Accordingly, at time t1, the required CQI related to the configured CSI-RSs (CSI-RS1, 3) and ZP-CSI-RSb, corresponding to the RS pairs of CSI-RS1/3 and ZP-CSI-RSb, will be calculated and fed back; while, in case of time t2, the required CQI related to (CSI-RS1, 2, 3) and (ZP-CSI-RSa, b, c, d), the same as that at time t0, will be calculated and fed back.

3.3) Sixth Example

As shown in FIG. 14, a sixth example of the communication method according to the third illustrative embodiment employs the signaling of RS pairs for not-required CQI to provide reusing available CSI-RS configuration as much as possible in the case of updating the CoMP measurement set. Instead of sending the RS pairs for calculating required CQI as in FIG. 13, the list of the RS pairs for not-required CQI is decided by the RS pair decision section 103 (see FIG. 4) and is sent to the target UE 20 to avoid the calculation of wrong CQI. The information of such a RS pair list is stored in the information elements of the RRC signal CQI-Report-Config or CSI-RS-Config and sent semi-statically to the UE 20. At the UE 20, the per CSI-RS-resource CQI, as shown in FIG. 17, is calculated in the CQI calculation section 204 (see FIG. 4) by using all combinations of the RS pairs but the CQI corresponding to the informed RS pairs is neither calculated nor reported.

For the sake of control signal overhead reduction, the RRC signal of the RS pair list for not-required CQI at time t0 does not need to be repetitively sent again at time t1 and t2 as illustrated in FIG. 14. At time t1, the CQI related to the RS pairs of CSI-RS1/3 and ZP-CSI-RSb used at time t1 will be calculated, which is excluded in the RRC signal of RS pair list for not-required CQI at time t0. At time t2, the CQI corresponding to all the combination of (CSI-RS1, 2, 3) and (ZP-CSI-RSa, b, c, d) will be calculated except the CQI of informed RS pairs for not-required CQI at time t0.

3.4) Seventh Example

As shown in FIG. 15, a seventh example of the communication method according to the third illustrative embodiment employs the signaling of the interference muting pattern list of muted cell IDs to provide reusing available CSI-RS configuration as much as possible in the case of updating the CoMP measurement set. In this example, similar CSI-RS configuration is used at time t0, t1 and t2, wherein the list of interference muting pattern with muted cell indexes is sent to the target UE 20a to avoid the calculation of wrong CQI. The information of such the interference muting pattern list is stored in the information elements of the RRC signal CQI-Report-Config or CSI-RS-Config and semi-statically sent to the UE 20a. At the UE 20a, the per CSI-RS-resource CQI, as FIG. 17, is decided by the required CQI decision section 206 and calculated by the CQI calculation section 204 (see FIG. 9).

For the sake of control signal overhead reduction, the RRC signal of the interference muting pattern list of muted cell indexes at time t0, does not need to be repetitively sent again at time t1 and t2; and only the updated muting pattern list, given in FIG. 15, needs to be sent to the UE 20a at time t2. At time t1, the required CQI related to (CSI-RS1, 3) and ZP-CSI-RSb used at time t1 is decided to be calculated, referring to the RRC signal of muting pattern Mb informed at time t0. At time t2, the required CQI related to (CSI-RS1, 2, 3) and (ZP-CSI-RSa, b, c, d) used at time t2 will be estimated as in FIG. 17 according to the RRC signal of muting pattern at time t0 and updated muting pattern at time t2.

3.5) Eighth Example

As shown in FIG. 16, a eighth example of the communication method according to the third illustrative embodiment employs the signaling of the interference muting pattern list with non-muted cell IDs to provide reusing available CSI-RS configuration as much as possible in the case of updating the CoMP measurement set. By using similar CSI-RS configuration at time t0, t1 and t2, the muting pattern list of non-muted cell IDs is sent to the target UE 20a to decide and estimate the required CQI. The information of such the interference muting pattern list is stored in the information elements of the RRC signal CQI-Report-Config or CSI-RS-Config and semi-statically sent to the UE 20a. At the UE 20a, the per CSI-RS-resource CQI, as shown in FIG. 17, is decided by the required CQI decision section 206 and calculated by the CQI calculation section 204 (see FIG. 9).

For the sake of control signal overhead reduction, the RRC signal of the interference muting pattern list of non-muted cell IDs at time t0 does not need to be repetitively sent again at t1 and t2; and only the updated muting pattern list, given in FIG. 16, needs to be known by the UE 20a at time t2. At time t1, the required CQI related to (CSI-RS1, 3) and ZP-CSI-RSb used at time t1 is decided to be calculated, referring to the RRC signal of muting pattern Mb informed at time t0. At time t2, the required CQI related to (CSI-RS1, 2, 3) and (ZP-CSI-RSa, b, c, d) used at time t2 will be decided as in FIG. 17 according to the RRC signal of muting pattern at time t0 and updated muting pattern at time t2.

3.6) Advantageous Effect

In the above examples as shown in FIGS. 13-16, the repeated RRC signal of the CSI-RS configuration may also be reduced for further control signal overhead reduction. At time t1, the configuration of non-zero-power CSI of (CSI-RS1, 3) and zero-power CSI of (ZP-CSI-RSb) has already been informed at time t0. Therefore, it is enough to tell the UE to delete the CSI-RS configuration related to Cell2 at time t1, i.e., to delete the CSI-RS2, ZP-CSI-RSa, c, d. At time t2, Cell4 is newly introduced in the CoMP measurement set. Comparing the CSI-RS configuration for the CoMP measurement set at time t1 and t2, the information on RS configuration for Cell1 and Cell3 is not repeated but only the configured non-zero-power CSI-RS of CSI-RS2 and zero-power CSI of (ZP-CSI-RSa, c, d) related to Cell4 needs to be informed to the UE. From the implementation point of view, the memory for previous RS configuration is needed at UE 20/20a.

In the above examples as shown in FIGS. 6-16, instead of non-zero-power CSI-Rs, CRS may also be used for signal power measurement; while, instead of zero-power CSI-RS, PDSCH muting REs or other specific interference measurement REs may also be used to measure the interference with muting for CoMP.

4. Fourth Illustrative Embodiment

According to the fourth illustrative embodiment, the function of the CCU 100 as shown in FIG. 4 is included as part of each base station (eNB) of the CoMP measurement set. In case of such inter-eNB CoMP, a UE is connected to multiple eNBs and the information is exchanged between the eNBs through X2 backhaul. Hereinafter the case of two eNBs will be described as an example.

As shown in FIG. 18, base stations eNB1 and eNB2 of the CoMP measurement set have the same block configuration and can communicate with each other through X2 backhaul interface. The eNB1 is provided with a control section having the functions of CCU1 which controls the radio station 110 as a serving cell (Cell1) through the backhaul link BL1. Similarly, the eNB2 is provided with a control section having the functions of CCU2 which controls the radio station 120 through the backhaul link BL2.

Each eNB controls the operations of base station as well as the operation of notifying the UE 20 of information implicitly or explicitly indicating interference-measuring resources so that the UE 20 can select valid pairs of CSI-RS and ZP-CSI-RS as shown in FIG. 3. Since its detailed operations are similar to those of the above-mentioned embodiments and examples, detailed descriptions are omitted.

5. Additional Statements

An illustrative embodiment is applicable to a mobile communications system employing different reference signals to measure signal and interference power for CQI calculation and feedback. The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

REFERENCE SIGNS LIST

10 network
20, 20*a* user equipment (UE)
100, 100*a* central control unit (CCU)
101 CoMP measurement set decision section
102 CSI-RS and muting pattern configuration section
103 RS pair decision section
104 joint scheduler
105 backhaul link communication section
106 controller
110 radio station (cell)
111 BL communication section
112 controller
113 radio transmitter
114 radio receiver
201 radio transmitter
202 radio receiver
203 signal and interference measurement section
204 CQI calculation section
205 controller
206 required CQI decision section

The invention claimed is:

1. A radio communication system comprising:
a radio station configured to transmit, to a user terminal, first information indicating a first resource for an interference measurement and second information indicating a second resource for a channel measurement,
wherein the radio station configured to receive channel quality information from the user terminal,
wherein the user terminal configured to receive the first information and the second information, and calculate the channel quality information based on the first resource and the second resource, and transmit the channel quality information to the radio station,
wherein the first resource and the second resource are different resources.

2. The radio communication system according to claim 1, wherein the first information and the second information are included in information elements of a higher-layer signal.

3. The radio communication system according to claim 1, wherein a reference signal for deriving the channel measurement is non-zero-power CSI reference signal.

4. The radio communication system according to claim 1, wherein a reference signal for deriving the interference measurement is a zero-power CSI reference signal.

5. The radio communication system according to claim 1, wherein the channel quality information is single channel quality information, and the user terminal calculates the single channel quality information based on the first resource and the second resource.

6. The radio communication system according to claim 1, wherein the first resource and the second resource correspond to the channel quality information.

7. A communication method comprising:
transmitting, to a user terminal, first information indicating a first resource for an interference measurement and second information indicating a second resource for a channel measurement; and
receiving the channel measurement from the user terminal,
wherein the user terminal configured to calculate channel quality information based on the first resource and the second resource and transmit the channel quality information to a radio station, and
wherein the first resource and the second resource are different resources.

8. The communication method according to claim 7, wherein the first information and second information are included in information elements of a higher-layer signal.

9. The communication method according to claim 7, wherein a reference signal for deriving the channel measurement is non-zero-power CSI reference signal.

10. The communication method according to claim 7, wherein a reference signal for deriving the interference measurement is a zero-power CSI reference signal.

11. The communication method according to claim 7, wherein the channel quality information is single channel quality information, and the user terminal calculates the single channel quality information based on the first resource and the second resource.

12. The communication method according to claim 7, wherein the first resource and the second resource correspond to the channel quality information.

13. control device comprising:
a transmitter configured to transmit, to a user terminal, first information indicating a first resource for an interference measurement and second information indicating a second resource for a channel measurement; and
a receiver configured to receive channel quality information from the user terminal,
wherein the user terminal configured to calculate the channel quality information based on the first resource and the second resource and transmit the channel quality information, and
wherein the first resource and the second resource are different resources.

14. The control device according to claim 13, wherein the first information and the second information are included in information elements of a higher-layer signal.

15. The control device according to claim 13, wherein a reference signal for deriving the channel measurement is non-zero-power CSI reference signal.

16. The control device according to claim 13, wherein a reference signal for deriving the interference measurement is a zero-power CSI reference signal.

17. The control device according to claim 13, wherein the channel quality information is single channel quality information, and the user terminal calculates the single channel quality information based on the first resource and the second resource.

18. The control device according to claim 13, wherein the first resource and the second resource correspond to the channel quality information.

19. A user terminal comprising:
- a receiver configured to receive, from a radio station, first information indicating a first resource for an interference measurement and second information indicating a second resource for a channel measurement;
- a controller configured to calculate channel quality information based on the first resource and the second resource; and
- a transmitter configured to transmit the channel quality information to the radio station,
- wherein the first resource and the second resource are different resources.

20. The user terminal according to claim 19, wherein the first information and the second information are included in information elements of a higher-layer signal.

21. The user terminal according to claim 19, wherein a reference signal for deriving the channel measurement is non-zero-power CSI reference signal.

22. The user terminal according to claim 19, wherein a reference signal for deriving the interference measurement is a zero-power CSI reference signal.

23. The user terminal according claim 19, wherein the channel quality information is single channel quality information, and the controller is configured to calculate the single channel quality information based on the first resource and the second resource.

24. The user terminal according claim 19, wherein the first resource and the second resource correspond to the channel quality information.

* * * * *

UNITED STATES PATENT AND TRADEMARK OFFICE
CERTIFICATE OF CORRECTION

PATENT NO. : 9,544,793 B2
APPLICATION NO. : 14/375515
DATED : January 10, 2017
INVENTOR(S) : Le Liu et al.

Page 1 of 1

It is certified that error appears in the above-identified patent and that said Letters Patent is hereby corrected as shown below:

In the Claims

Claim 13, Column 16, Line 52, "control device comprising:" should read -- A control device comprising: --.

Signed and Sealed this
Ninth Day of May, 2017

Michelle K. Lee
*Director of the United States Patent and Trademark Office*